US010351150B1

(12) United States Patent
Lederman et al.

(10) Patent No.: US 10,351,150 B1
(45) Date of Patent: Jul. 16, 2019

(54) SYSTEM TO ENABLE RAIL INFRASTRUCTURE MONITORING THROUGH THE DYNAMIC RESPONSE OF AN OPERATIONAL TRAIN

(71) Applicant: Carnegie Mellon University, Pittsburgh, PA (US)

(72) Inventors: George Lederman, Pittsburgh, PA (US); Jacobo Bielak, Pittsburgh, PA (US); Hae Young Noh, Pittsburgh, PA (US); James H Garrett, Pittsburgh, PA (US); Siheng Chen, Pittsburgh, PA (US); Jelena Kovacevic, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 397 days.

(21) Appl. No.: 15/168,735

(22) Filed: May 31, 2016

Related U.S. Application Data

(60) Provisional application No. 62/230,162, filed on May 29, 2015.

(51) Int. Cl.
*B61L 23/04* (2006.01)
*B61L 25/02* (2006.01)
*G01H 1/00* (2006.01)

(52) U.S. Cl.
CPC .......... *B61L 23/042* (2013.01); *B61L 25/025* (2013.01); *G01H 1/00* (2013.01); *B61L 2205/04* (2013.01)

(58) Field of Classification Search
CPC .... B61L 23/042; B61L 23/044; B61L 23/045; B61L 23/047; B61L 23/048
See application file for complete search history.

(56) References Cited

U.S. PATENT DOCUMENTS

| 5,332,180 | A | * | 7/1994 | Peterson | ................. B61L 3/004 246/122 R |
| 5,743,495 | A | * | 4/1998 | Welles, II | ............. B61L 23/044 246/121 |
| 2,987,979 | A | | 11/1999 | Bryan | |
| 5,987,979 | A | * | 11/1999 | Bryan | ...................... B61K 9/08 33/1 Q |

(Continued)

OTHER PUBLICATIONS

Molodova, et al., Automatic Detection of Squats in Railway Infrastructure, IEEE Trans. Intell Trans Sys., vol. 15, No. 5, pp. 1981-1990, Oct. 2014.

*Primary Examiner* — Zachary L Kuhfuss

(57) ABSTRACT

This invention relates to a vehicle-based infrastructure diagnostic apparatus to assist in the maintenance of rail networks. This is a complete system—from the acquisition of vibration signals in a moving vehicle, to the presentation of the infrastructure changes to the maintenance workers. This apparatus relies on novel techniques to account for the variable speed of the train (making it useful even on non-dedicated rail vehicles) and novel techniques to normalize for various environmental conditions. This system could help maintenance departments identify and remediate anomalies more rapidly, as well as trace network deterioration over time. The apparatus consists of low-cost unobtrusive sensors, software for data analysis, and hardware that makes it easy to deploy widely even on existing rail networks.

16 Claims, 46 Drawing Sheets
(15 of 46 Drawing Sheet(s) Filed in Color)

(56) References Cited

U.S. PATENT DOCUMENTS

| | | | | |
|---|---|---|---|---|
| 6,044,698 A | * | 4/2000 | Bryan | B61K 9/08 73/146 |
| 8,155,809 B1 | * | 4/2012 | Bilodeau | B61L 23/042 246/120 |
| 2009/0187296 A1 | * | 7/2009 | James | B61L 23/14 701/19 |
| 2014/0071269 A1 | * | 3/2014 | Mohamed | G01B 11/14 348/135 |
| 2015/0308927 A1 | * | 10/2015 | Kono | B61L 23/042 702/182 |

* cited by examiner

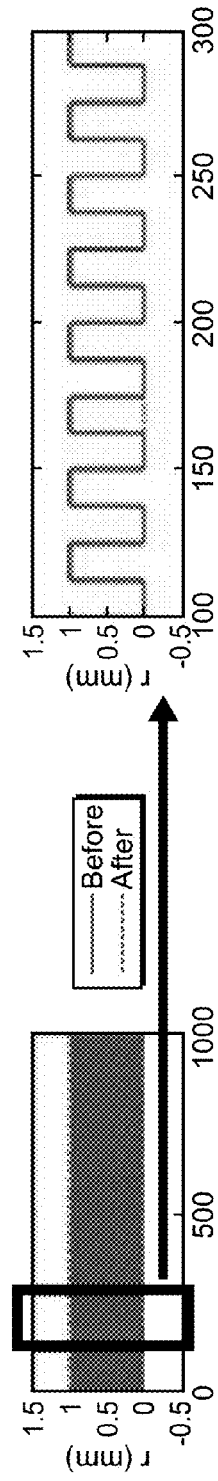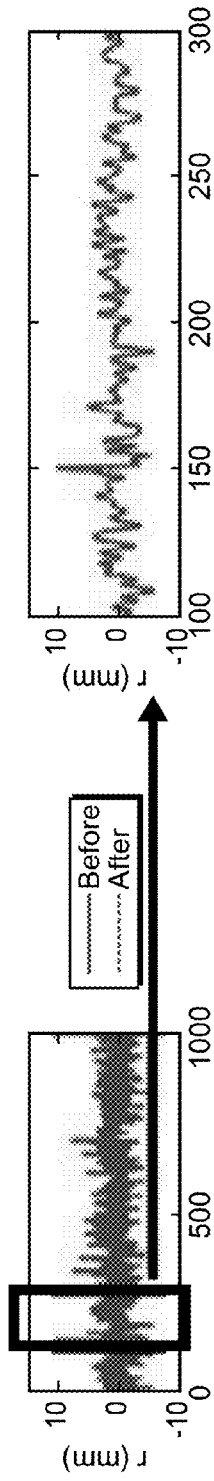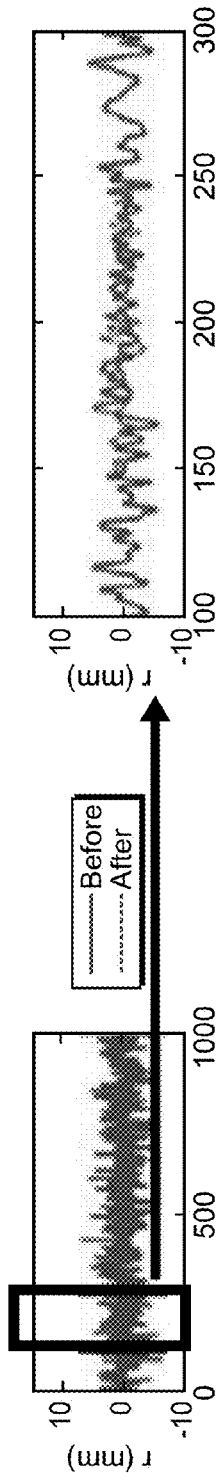

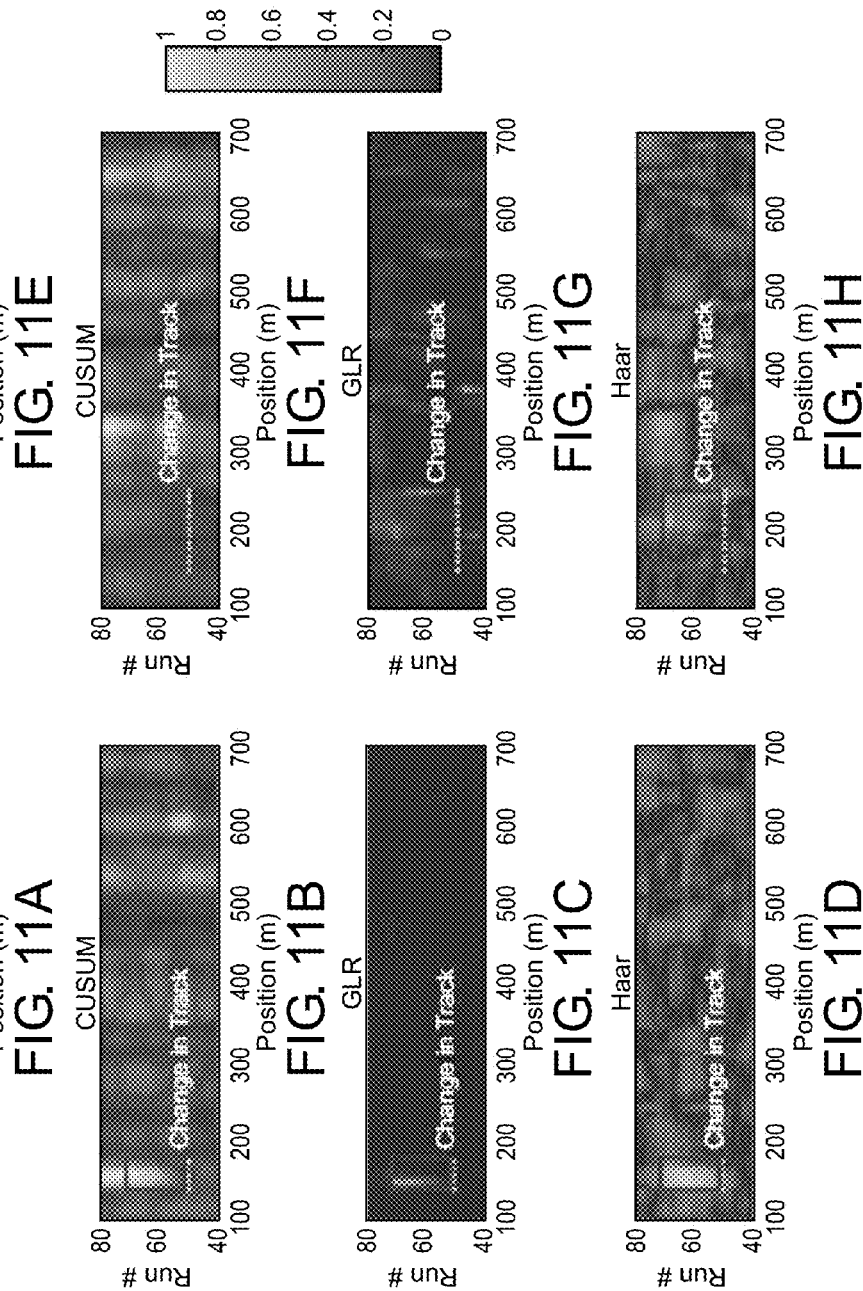

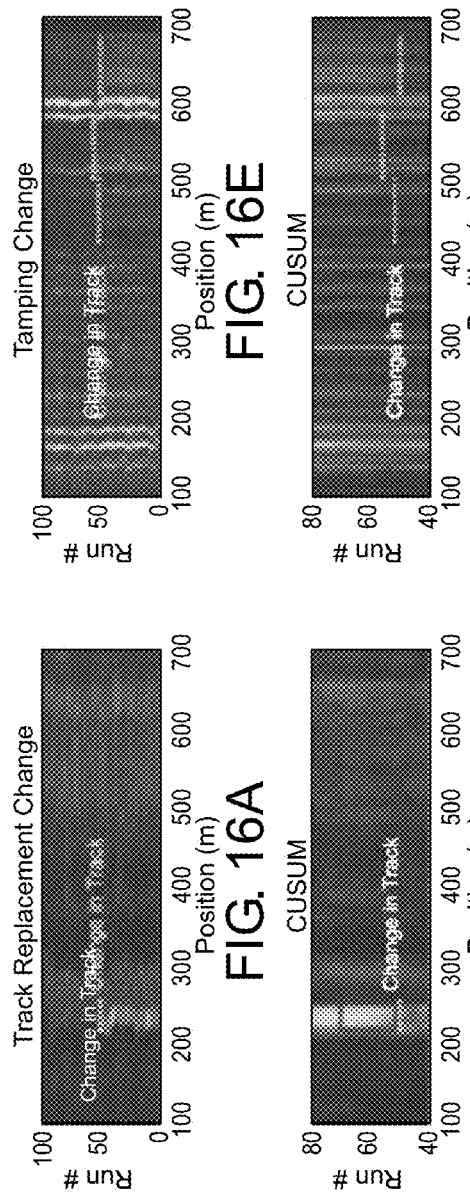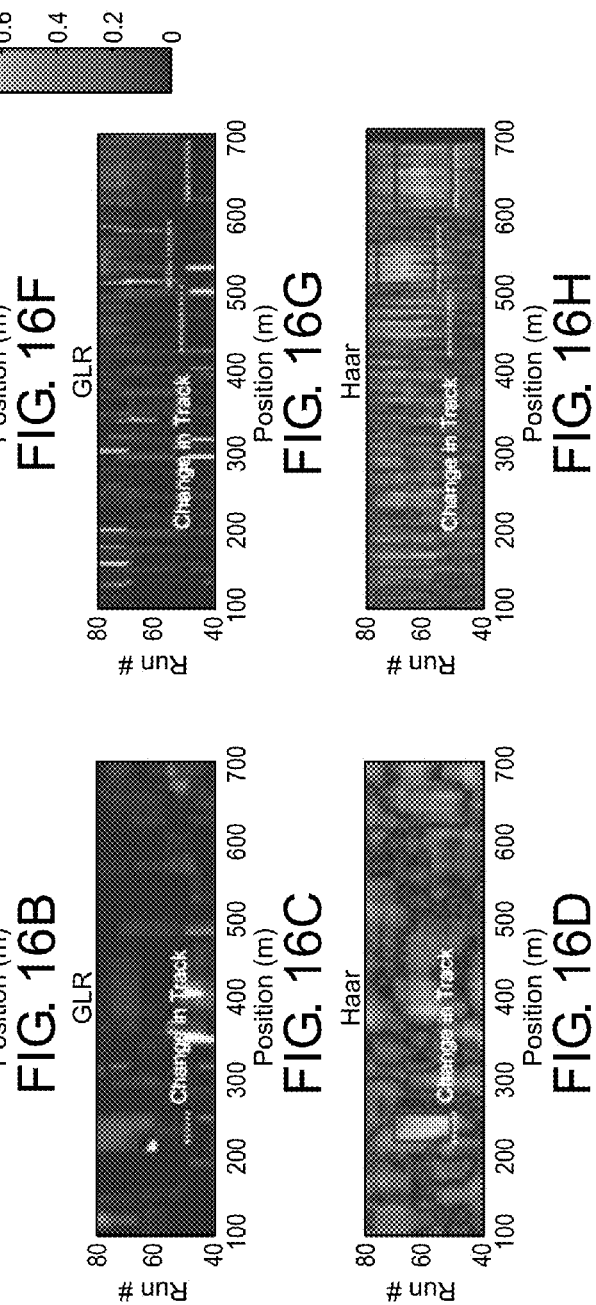
FIG. 16A Track Replacement Change
FIG. 16B CUSUM
FIG. 16C GLR
FIG. 16D Haar
FIG. 16E Tamping Change
FIG. 16F CUSUM
FIG. 16G GLR
FIG. 16H Haar

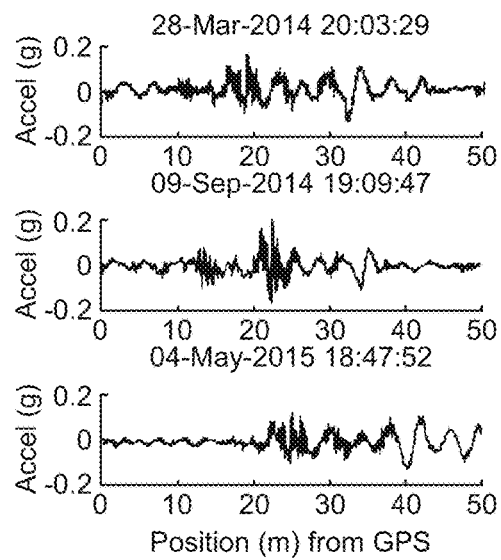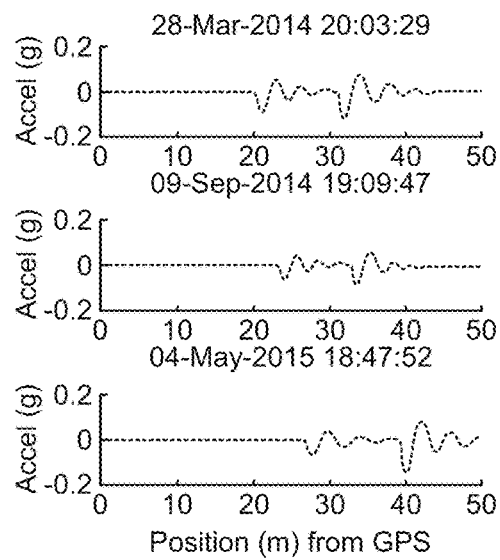
FIG. 18A                    FIG. 18B
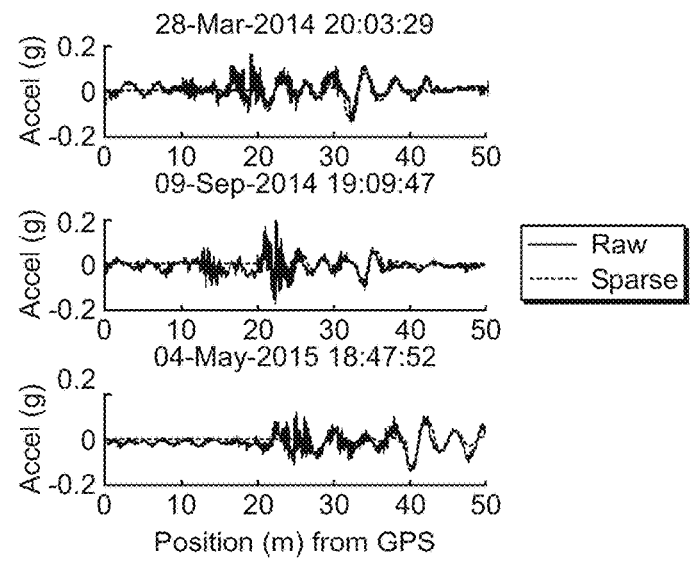
FIG. 18C

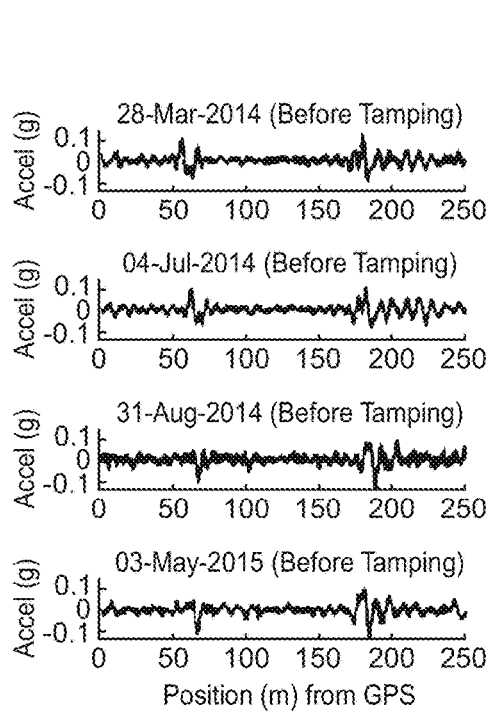
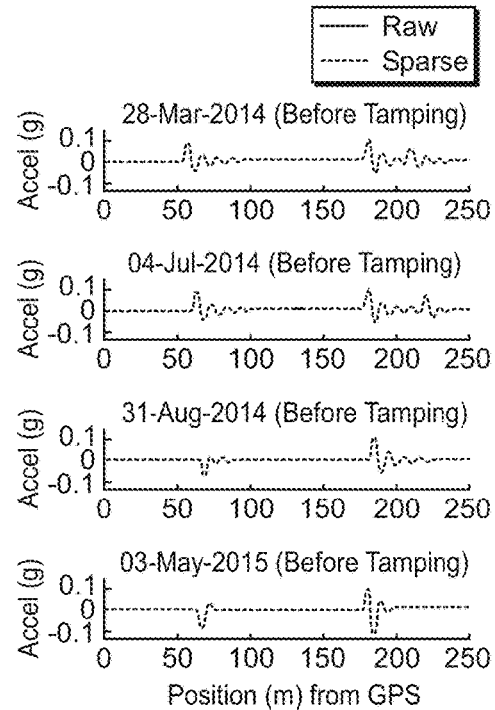
FIG. 26A
FIG. 26B
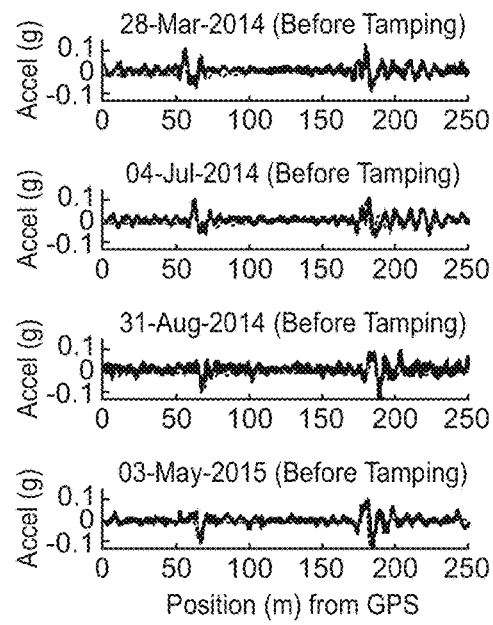
FIG. 26C

| Algorithm 1 Kalman Filter |
| --- |

This algorithm is repeated for each time-step $k$.

Predict
1. Estimate the state where $a$ is some constant describing the linear process of interest.

$$\hat{x}_k = a\hat{x}_{k-1} \tag{3}$$

2. Estimate the the error variance of the prediction, $pk$.

$$p_k = ap_{k-1} \tag{4}$$

Update
3. Update the Kalman gain, $k_{kj}$, for each of the $j$ sensors. Here $r_j$ is the variance for each of the $j$ sensors; in the basic Kalman filter, the sensor variance is assumed to be known *a priori*.

$$k_{k,j} = \frac{p_k}{p_k + r_j} \tag{5}$$

4. Update the state estimate, $\hat{x}_k$, based on the currect measurement data, $z_{kj}$, from the $j$ sensors $$\hat{x}_k = \hat{x}_{k-1} + \sum_j k_{kj}(z_{kj} - \hat{x}_{k-1}) \tag{6}$$

5. Update the prediction variance, $pk$.

$$p_k = \left(1 - \sum_j k_{kj}\right) p_k \tag{7}$$

FIG. 28

Algorithm 1 Kalman Filter

This algorithm is repeated with each new $k^{th}$ pass over the tracks of interest.

1. Align Data I - find the optimal offset, $\hat{m}_{k,j}$, between the measured data at the $k^{th}$ pass from the $j^{th}$ sensor, $z_{k,j}$, and the estimated state at the previous pass, $\hat{x}_{k-1}$.

$$\underset{\hat{m}_{k,j}}{\operatorname{argmax}} \left( \sum_{n=1}^{N} \hat{x}_{k-1}[n] z_{k,j}[n + \hat{m}_{k,j}] \right) \qquad (8)$$

2. Align Data II - determine the estimate of the correctly aligned data, $\hat{z}_{k,j}$.

$$\hat{z}_{k,j}[n] = z_{k,j}[n + \hat{m}_{k,j}] \qquad (9)$$

For values of $n$ where $z_{k,j}[n + \hat{m}_{k,j}]$ is undefined (i.e. $n + \hat{m}_{k,j} > N$), set $\hat{z}_{k,j}[n] = 0$.

3. Kalman Filter I - estimate the sensor variance, $r_{k,j}$.

$$r_{k,j} = (\hat{z}_{k,j} - \hat{x}_{k-1})^T (\hat{z}_{k,j} - \hat{x}_{k-1}) \qquad (10)$$

4. Kalman Filter II - calculate the Kalman Gain, $k_{k,j}$. Here $p_{k-1}$ is the prediction error from the previous step.

$$k_{k,j} = \frac{p_{k-1}}{p_{k-1} + r_{k,j}} \qquad (11)$$

5. Kalman Filter III - estimate the current state.

$$\hat{x}_k = \hat{x}_{k-1} + \sum_j k_{k,j} (\hat{z}_{k,j} - \hat{x}_{k-1}) \qquad (12)$$

6. Kalman Filter IV - update the prediction error.

$$p_k = \left( 1 - \sum_j k_{k,j} \right) p_{k-1} \qquad (13)$$

If $p_k < p_{min}$, $p_k = p_{min}$.

FIG. 29

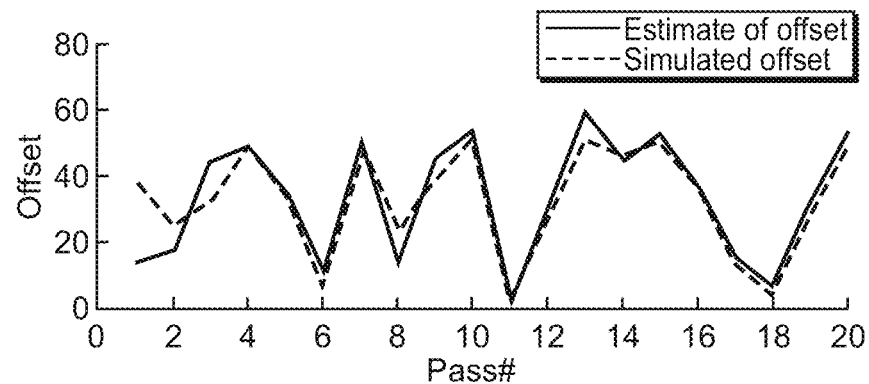
FIG. 35A
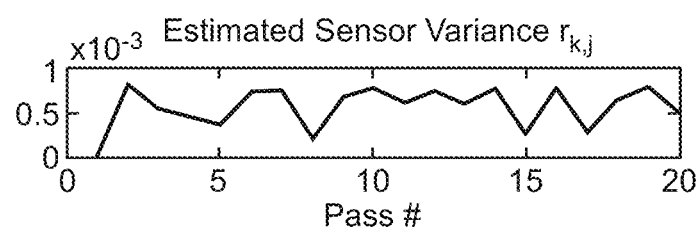
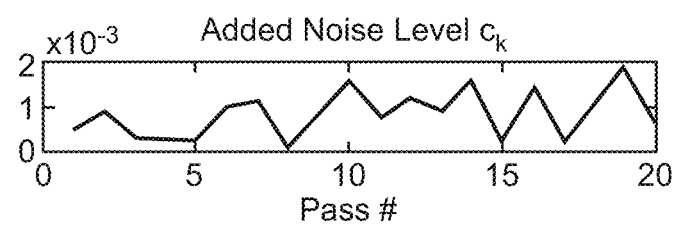
FIG. 35B

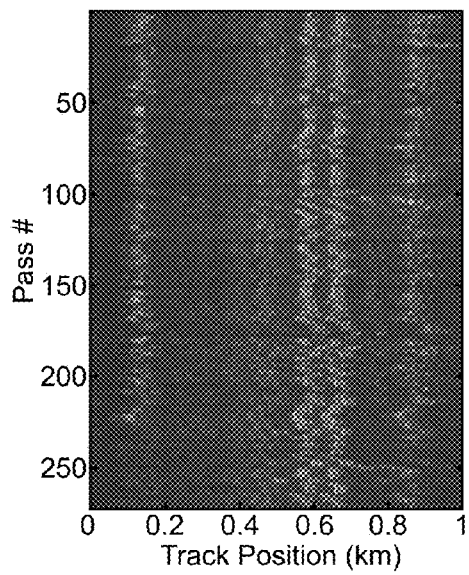 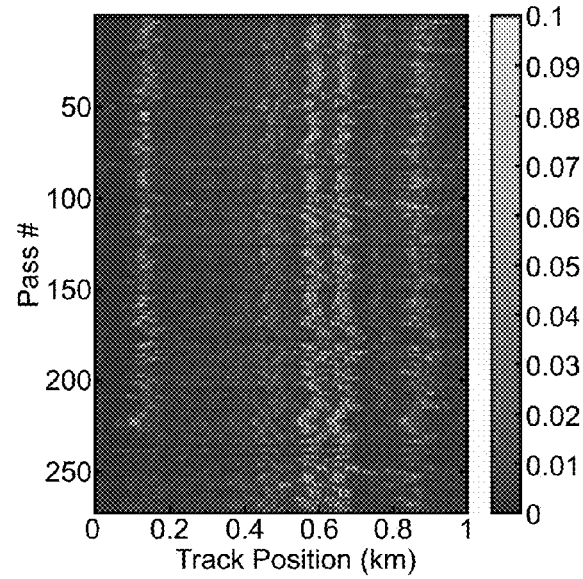
FIG. 36A　　　　　　　　FIG. 36B
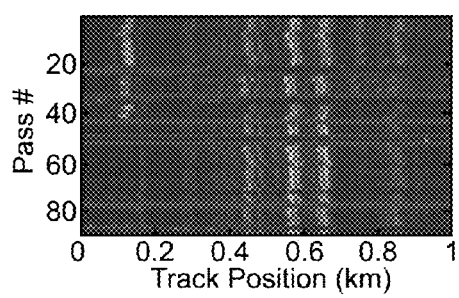 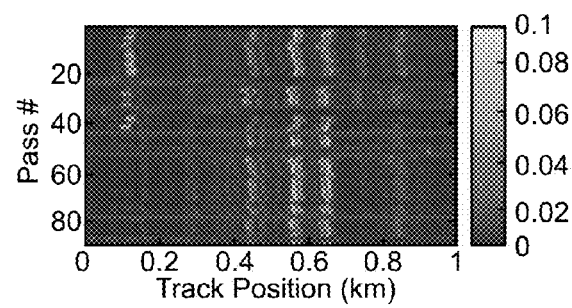
FIG. 36C　　　　　　　　FIG. 36D

SYSTEM TO ENABLE RAIL INFRASTRUCTURE MONITORING THROUGH THE DYNAMIC RESPONSE OF AN OPERATIONAL TRAIN

RELATED APPLICATIONS

This application claims the benefit of U.S. Provisional Patent application Ser. No. 62/230,162, filed May 29, 2015, which is incorporated herein in its entirety.

GOVERNMENT INTEREST

This invention was made with government support under National Science Foundation Grant No. CMMI1130616 and CCF1017278, an NSF Graduate Research Fellowship under Grant No. DGE0946825, and a University Transportation Center grant (DTRT12-G-UTC11) from the US Department of Transportation. The U.S. government may have certain rights in this invention.

BACKGROUND OF THE INVENTION

Monitoring rail infrastructure is important for both ensuring safety and determining the optimal timing for maintenance. Monitoring today is primarily performed through visual inspection that is both subjective and periodic. Railroad infrastructure has typically been monitored and inspected by a combination of visual inspections and specialty track inspection vehicles, known as track geometry cars. Additional tests such as ultrasonic rail inspection or track geometry assessments are performed using specialized rail vehicles, however, these vehicles are expensive to acquire and operate, and can disrupt traffic. As such, tracks are inspected infrequently. In addition, these tests are narrow in scope. For example, ultrasonic inspection only looks for internal material defects in the "head" of the rail, the part of the rail in contact with the vehicle.

Proposals have been made to use vibration-based monitoring to assess the track profile as a lower-cost alternative to the type of optical sensors currently employed on track geometry cars. These proposals typically assume that the sensors are placed on the axle of the train so that they have a direct mechanical connection to the track. In addition, they assume the position of the train is known, typically achieved by requiring that the inspection car operate at a constant speed.

But perhaps the greatest shortcoming of the current systems is not the sensor configuration, but it is the method in which the data is analyzed. Most systems look for a particular type of track damage and trigger a detection when a certain data value (or feature value derived from this data) exceeds a certain threshold. Such a procedure is limited to detecting one or only a few types of damage, and can often be triggered falsely. For example, one prior art method detects squats in railway tracks, using such a threshold system. However locations that naturally cause large accelerations, like switch gear, need to be manually removed from the data so that they do not cause false alarms. A more robust system might detect changes relative to the historical behavior of the tracks rather than their current state. And such a method of analysis would allow the sensors to be placed anywhere on the train as will be discussed.

It would therefore be desirable to provide a system and method for performing vibration-based monitoring of track without the limitations of the current proposals.

SUMMARY OF THE INVENTION

The present invention is a complete rail-infrastructure monitoring apparatus that can be deployed on new or existing rail networks by placing low-cost sensors on operational trains.

The invention addresses current shortcomings with previous systems, in particular, it presents novel techniques to deal with variable environmental and operational conditions. The invention has several key components including the acquisition of vibration data and position data from an operational train, a database structure to store data according to the geographic region of track, signal processing techniques to remove noise from the data and select pertinent features, anomaly detection methods to automatically flag potential issues in the infrastructure, and a user interface to show pertinent information to rail workers. Rapid notification of anomalies through the user interface will aid to ensure rail safety and facilitate timely maintenance.

Because the speed of a train varies from pass-to-pass over a section of track, the present invention includes methods robust to train speed. This is particularly challenging when the sensors are in the train's cabin, because the train's suspension filters the roughness from the track differently depending on speed. Additionally, due to GPS noise, the precise location of the train is not always known. Therefore, the invention also takes position uncertainty into account.

To account for variable speed, the data is interpolated spatially so that sections of the signal are associated with particular regions of the track. To enable this type of interpolation, features that vary slowly were selected such that readings from one region are consistent over many days. One feature that meets this criterion is the average signal energy over a section of track. This feature is capable of detecting subtle changes in track geometry.

To account for variable temperature, the signal features are mapped to a manifold. Under normal conditions, the system's algorithm learns how the features vary with temperature, so that anomalous behavior for a given temperature can be rapidly detected, even if that behavior is not necessarily anomalous overall.

The user interface has two benefits: information can be conveyed quickly to rail workers to keep them informed and they in turn can also give feedback on the quality of anomalies detected. This allow for the continual improvement of the detection algorithm, a phenomenon known as reinforcement learning.

The present invention uses operational trains and allows the sensors to be placed inside the cabin of the vehicle. By using operational trains, no dedicated monitoring vehicles are required, track closures are avoided, and tracks can be interrogated more frequently. The high frequency of interrogation not only means that issues can be flagged more rapidly, but also more passes over areas of interest can be collected, meaning greater statistical confidence about the state of the track. Lastly, by allowing the sensors to be placed in the cabin, the sensors can be installed more easily and can be protected from the external environment.

To validate the system, simulated data was used initially and the vehicle was modeled as a single degree-of-freedom oscillator travelling over a rough track. Subsequently, the system was run against data collected from actual instrumented light-rail vehicles. The system is able to detect broken tracks (i.e., a localized spike in the track profile), which is then replaced, as well as tamping, a maintenance procedure that subtly corrects track geometry.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 7A-F show three types of roughness changes (left plots), with detail of each (right plots).

FIGS. 11A-H show the application of different change detection filters to the data.

FIGS. 16A-H show change detection on the light-rail dataset for the track replacement change and tamping change.

FIGS. 18A-C show raw data and their respective sparse approximations for three passes of a train over a 50 m section of track.

FIGS. 26A-C shows the sparse approach as applied to the bridge data shown in FIG. 25.

FIG. 28 shows the Kalman Filter Algorithm

FIG. 29 shows the propose modification of the Kalman filter.

FIGS. 35A-B show an estimation of the simulated o set values and the sensor noise level.

FIGS. 36A-D show data from the instrumented trains as they pass over a 1 km section of track, and the associated dates of each pass.

DETAILED DESCRIPTION OF THE INVENTION

Although the train-rail interaction is well understood, it is difficult to model accurately, particularly the response of the train over a specific section of track. Such a model would need to include the rail roughness, the ballast geometry, and any underlying track structures along with the appropriate environmental conditions. The uncertainty inherent in modeling them can invalidate model-based structural health monitoring techniques that appear promising theoretically.

This invention provides for monitoring a wide-array of rail assets from the dynamic response of a passing train using a data-driven approach, where infrastructure deterioration is diagnosed not in relation to an analytical model, but in relation to the asset's historical behavior.

Figure 1:
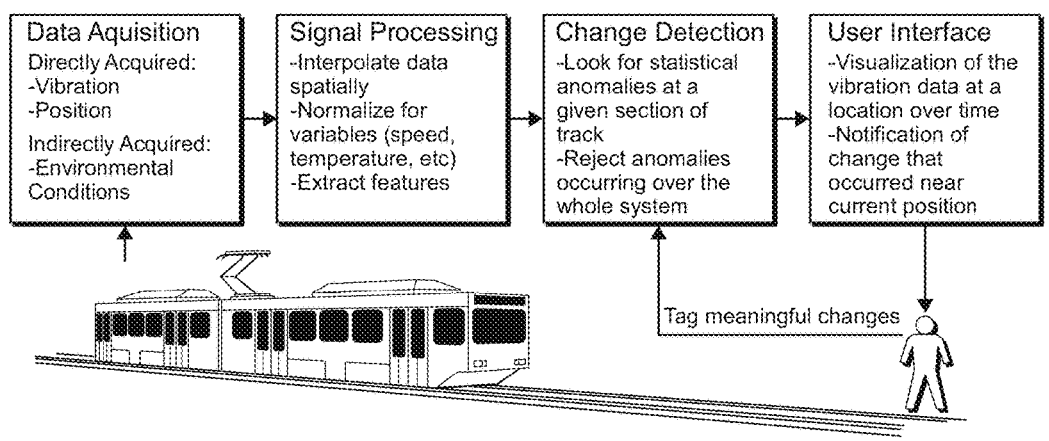
FIG. 1 shows the overview of the invention from the data acquisition to the presentation of the information to the relevant authorities.

A high level implementation can be described as such. Sensor data is collected with location information over the rail network via active trains. The sensor data is run through signal processing algorithms to extract rail specific information. This processed data can then be compared to historical data over the same rail sections, with changes noted to rail personnel. This is process is illustrated in FIG. 1.

Figure 2:
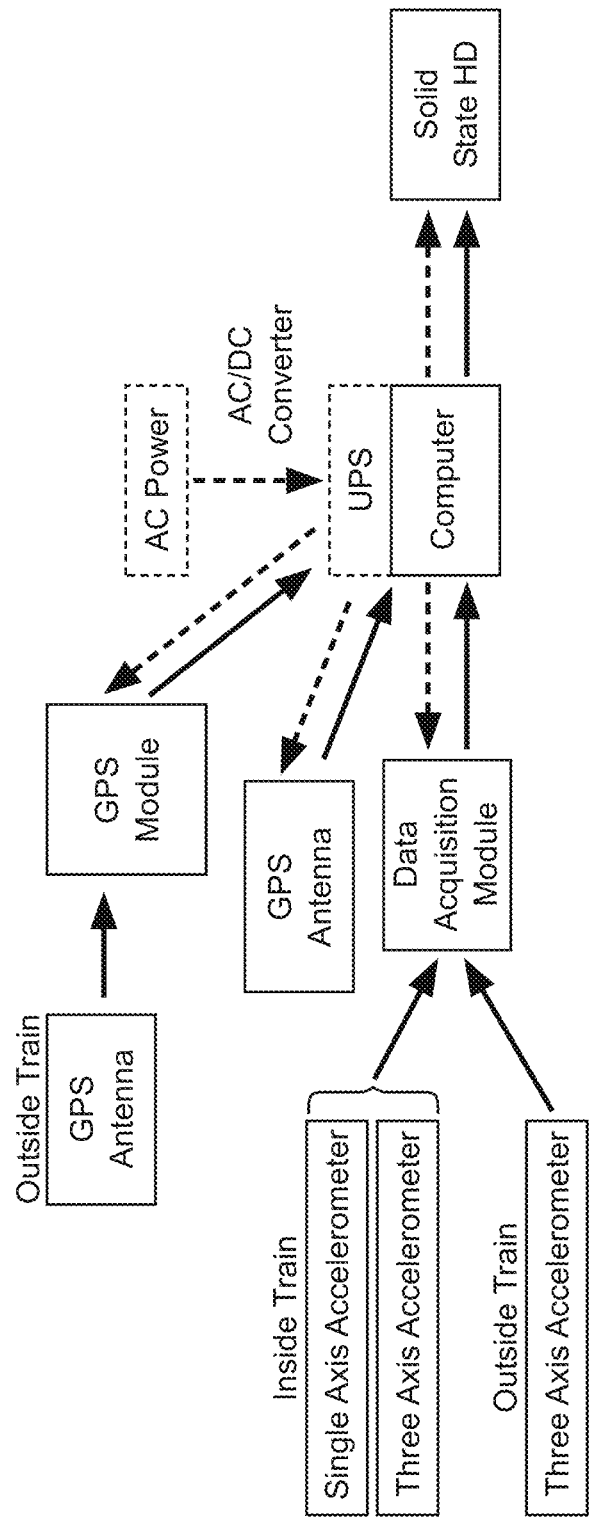
FIG. 2 illustrates the hardware schematic for the data acquisition box in FIG. 1.
Figure 3:
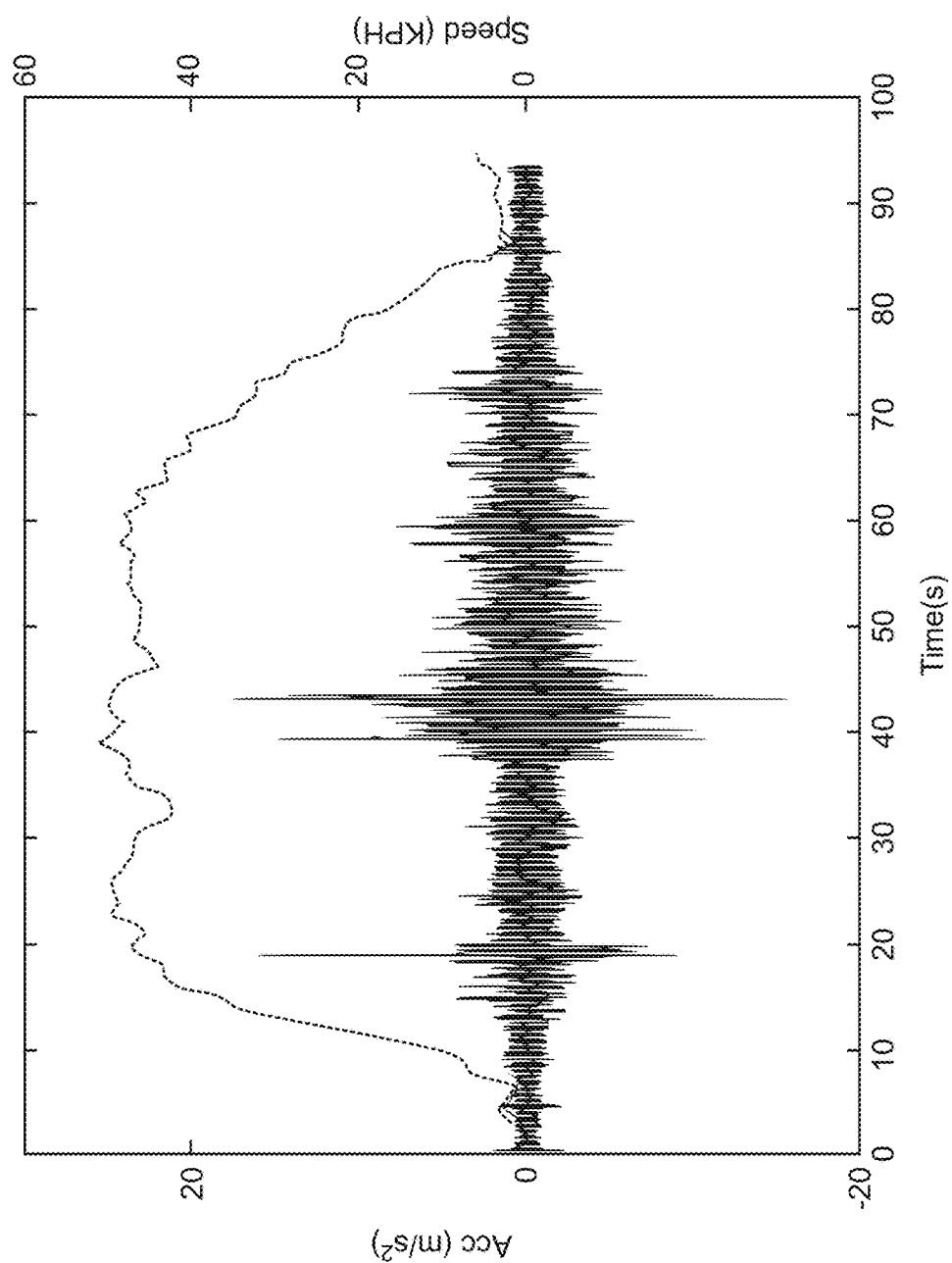
FIG. 3 presents typical data collected from the train, using both the accelerometers (to measure vibrations) and GPS to measure train speed.

In one implementation, the system hardware consists of multiple sets and types of accelerometers mounted both inside the train and on the outside the train. A triaxial accelerometer (PCB model 354C03) is mounted on the middle wheel truck; it has a direct mechanical connection to the vibrations in the axle as it is mounted on the un-sprung portion of the train. Two uniaxial accelerometers (Vibra-Metrics model 5102) are placed inside the cabin of the car. The accelerometer outputs are gathered into a data-acquisition unit. A GPS antenna is mounted on the outside of the train, connected to a GPS module to provide location data. The GPS information is recorded every second, allowing for speed calculations, along with environmental condition lookups via national weather database. The output of the GPS module and data-acquisition unit, as depicted in FIG. 3, is run to a computer in order to perform signal processing and database building, with the database stored in a connected storage unit. The block diagram of this configuration is listed in FIG. 2.

FIG. 3 presents a typical data snapshot collected from the system, using both the accelerometers (to measure vibrations) and GPS to identify location and measure train speed.

Signal processing plays a crucial role in attaining a low-cost monitoring scheme, given the complexity of the raw data. The first task has been to transform data from the time domain into a spatial domain. The second task is to extract features that reduce the dimensionality of the signal while preserving underlying information about the infrastructure.

Figure 4:
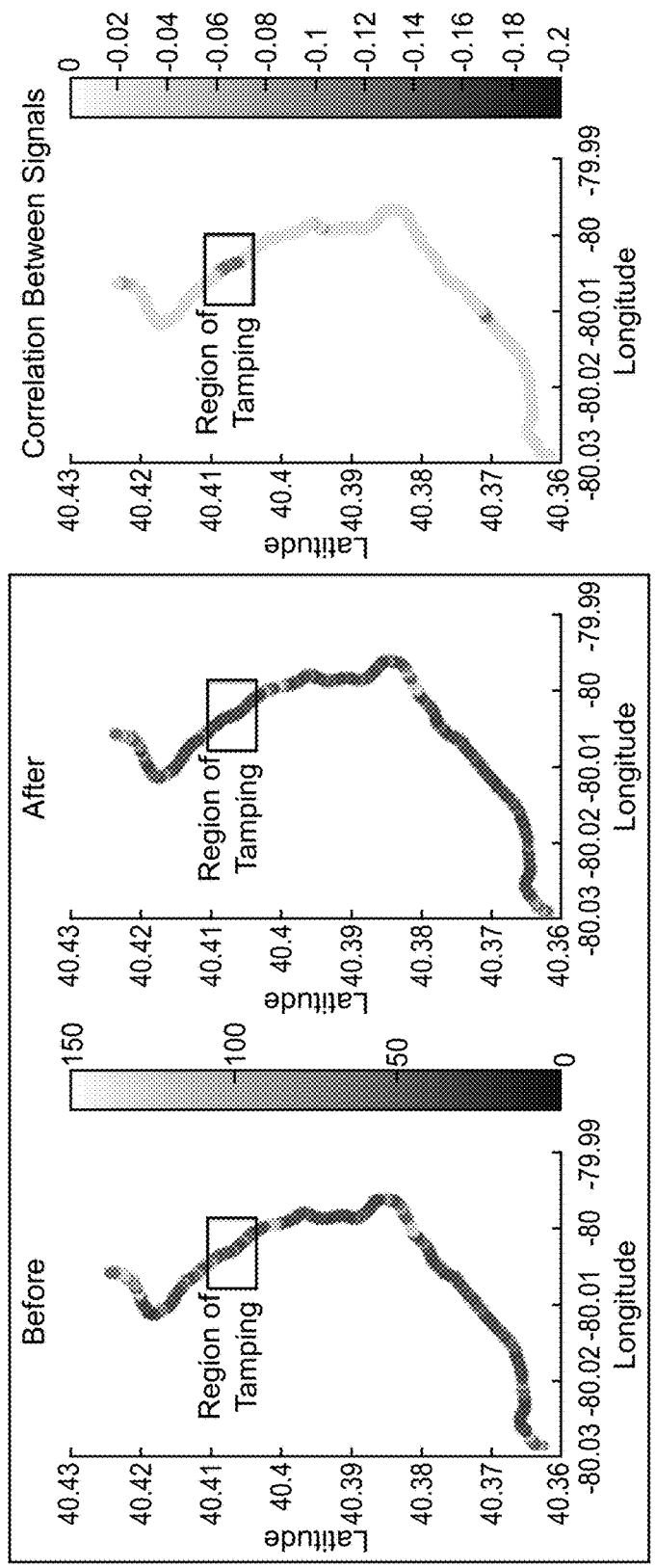
FIG. 4 shows two data sets collected from a stretch of railway after some modification to the infrastructure were made.

Once the data is processed, comparisons with past travels can be performed. FIG. 4 shows some of the subtle changes the apparatus detected when deployed on a prototype system on Pittsburgh's Light Rail System. By using the moving average of the energy profile of the signal, the signal becomes smooth enough to be interpolated spatially. These readings are consistent over time except in areas in which maintenance occurs. By looking at the correlation of the signals, the algorithm detects areas where work has been done (as these are the areas with low correlations to historical data.)

Figure 5:
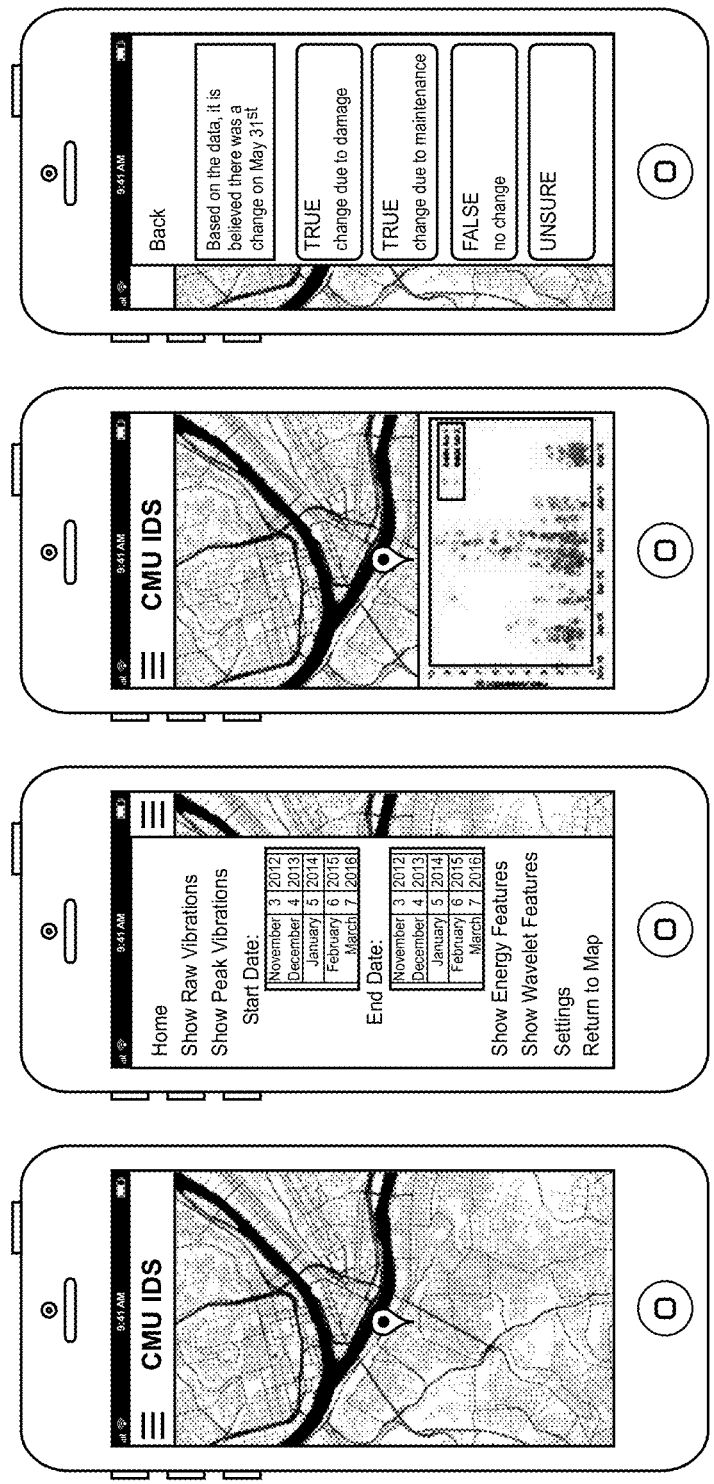
FIG. 5 displays some screen samples of a user interface that allow rail workers access to the information recorded by the train

Lastly, the information is relayed to the rail personnel. FIG. 5 displays some samples of the screens of a user interface that allow track workers access to the information recorded by the train. This also allows the rail workers on the track to give the system feedback about whether the detected changes are important for maintenance.

Figure 6:
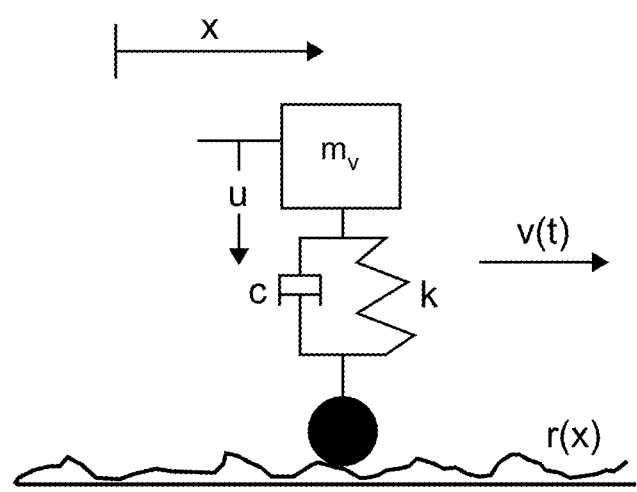
FIG. 6 shows a simple travelling oscillator use to model the suspension system of the railcar.

To understand how track roughness, filtered by the train's suspension, produces vibrations in the train's cabin, the train was modelled as a simple travelling damped oscillator as shown in FIG. 6. A simulation study was conducted as will be described in the following section, to determine how to detect changes in a section of track as the oscillator traveled repeatedly over it.

Figure 8:
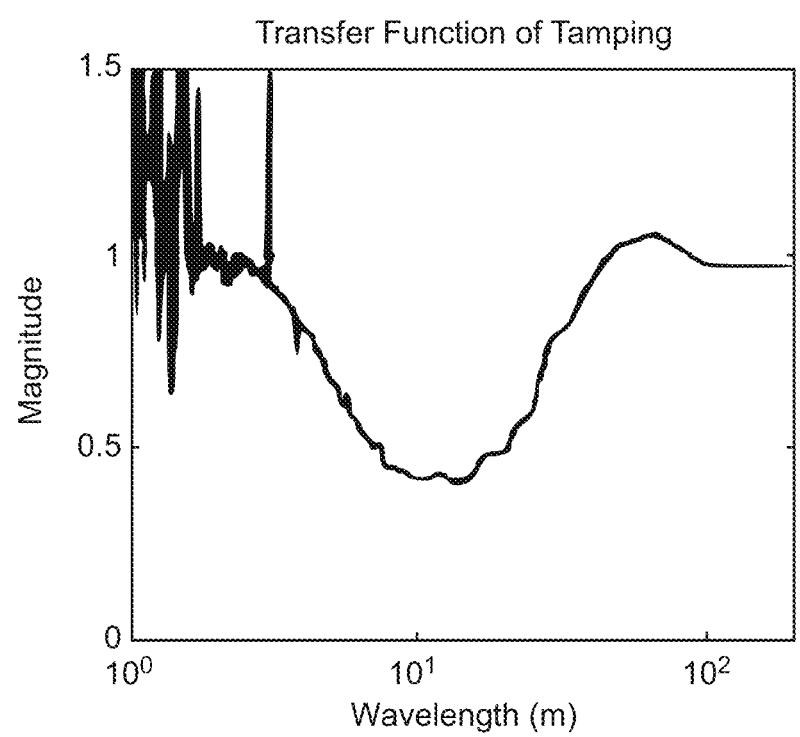
FIG. 8 shows the change due to tamping, as simulated.

To simulate track roughness, a 1 km section of track was generated for three change types, each of which is shown in FIG. 7. The first track change, in FIG. 7A, is a toy-model of roughness used to visualize the simulation. For the second and third track changes, shown in FIGS. 7C and 7E, two types of track changes were simulated. First, a large localized spike that was removed, simulating the replacement of a broken track (detail in FIG. 7D). Second, a smoothing of a track profile, simulating tamping (detail in FIG. 7F). For each of these realistic changes, a realistic track roughness was simulated using known parameters. For the tamping change, the track roughness was filtered as per the smoothing effect of the tamping machine as shown in FIG. 8, reducing the standard deviation of the track profile from 2 mm to 1.5 mm over a 200 m section of track. For each simulated profile, we generated 25 samples per meter for 25,000 samples per profile; the wavelengths which most influence the fundamental frequency of train cabin (and thus our oscillator) are between 2 m and 50 m, so this sampling rate provided adequate resolution.

Figure 9A:
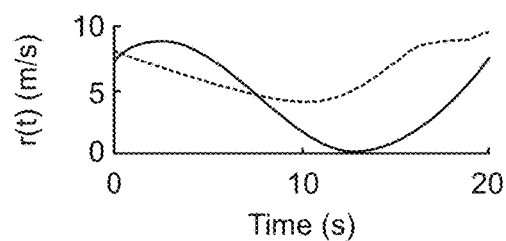
FIGS. 9A-F show a plot of track roughness with different speed profiles.
Figure 9B:
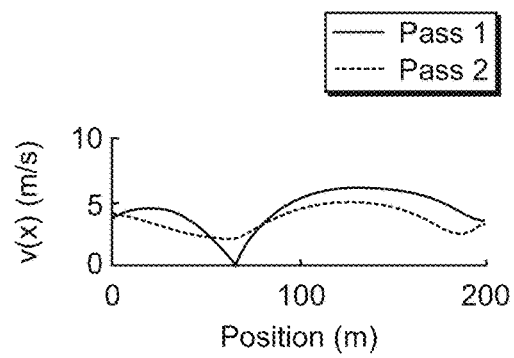
Figure 9C:
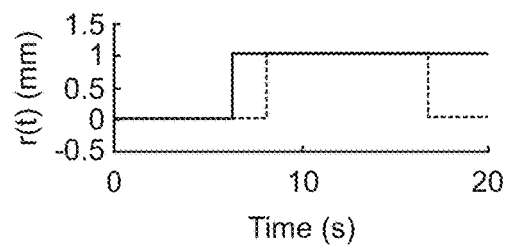
Figure 9D:
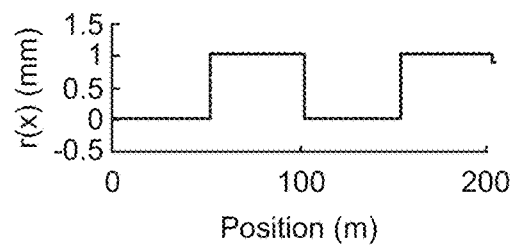

Once the track roughness was generated, the next step was to generate the response of the oscillator. Two realizations of this process over the same roughness with different speed profiles are shown in FIG. 9. FIG. 9A shows the speed profiles in the time domain, while FIG. 9B shows them in the spatial domain (i.e. plotted against position). Note that, when the speed approaches zero, no distance is covered, producing the scalloping effect in FIG. 9B, a phenomenon which is common when the train stops at a station. When generating the speed profile, the speed was limited to be between 0 and 15 m/s (35 MPH/55 KPH), which is the same as that of the light-rail vehicle in our deployment. The toy-model roughness profile is shown in FIG. 9D as a function of position, but the train experiences this profile in the time domain FIG. 5C. The response of the oscillator in FIG. 9E was generated by solving the differential equation:

$$\ddot{u}(t)+2\zeta\omega_n(\dot{u}(t)-\dot{r}(t))+\omega^2 n(u(t)-r(t))=0, \quad (1)$$

where $\zeta$ is the damping ratio of the oscillator, $\omega_n$ is the natural frequency of the oscillator, u(t) is the displacement of the oscillator, and r(t) the track roughness as shown in FIG. 1. For each pass, 200 seconds of the dynamic response train was simulated, with a time-step of 0.01 s; thus each pass had a length of 20,000 samples.

Figure 9E:
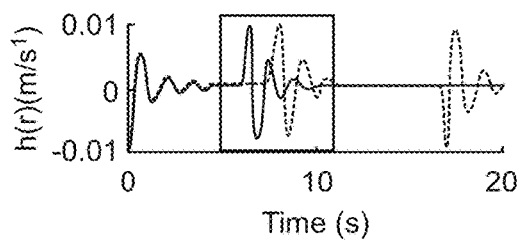

Although the bumps in the track occur at the same location in space, due to the difference in the speed profiles, the oscillator is excited in the two passes at different points in time, as highlighted by the box in FIG. 9E. This posed a challenge when comparing multiple passes in the time domain, so the signal was interpolated into the spatial domain as seen in FIG. 8F. Given that the response of the oscillator is smoother than the track roughness, when performing linear interpolation, the dynamic response was sampled at a rate of 10 samples/m.

The bumps experienced by the oscillator line up more closely in the spatial domain, but the effects of varying speed are still visible. The wavelengths of the oscillators (the distance over which they occur) varies considerably in FIG. 9F due to the speed (as highlighted in the box), even though the periods of the oscillations (their duration in time) are invariant, as can be seen in FIG. 5E.

The variation in FIG. 9 highlights one of the challenges of dealing with variable speed; a second challenge lies in not knowing the exact position of the oscillator, a phenomenon that occurs in practice due to GPS error. To plot the signal in the spatial domain, as shown in FIG. 9F, the position of the oscillator, x(t) was used. In practice, only some approximation of the position is known, $x_\varepsilon(t)=x(t)+\varepsilon(t)$, where $\varepsilon$ is the error. Assuming that this error is normally distributed with zero-mean and standard deviation $\sigma$, the effect of this error with different standard deviations in FIG. 9.

As the train's position and the associated uncertainty affect the results, the method in which the uncertainty is applied requires further comment. The position vector, x, is generated based on the speed profiles shown in FIG. 9. Because the speeds are positive, the position either increases or remains the same with each step. In order to simulate position uncertainty, we add Gaussian noise, $\varepsilon_o$. From a practical standpoint, in order to interpolate the data spatially, the position vector must be monotonically increasing, so this noise poses a challenge. Physically, if the position vector does not increase monotonically, it means the train is moving backwards at some time-steps, something we know does not happen. To avoid this problem, we sort the values as follows:

$$x_\varepsilon = \text{sort}(x+\varepsilon_o).$$

This new position vector differs from the original position vector according to ε:

$$\varepsilon = x - x_\varepsilon.$$

This resulting error follows the normal distribution according to $\varepsilon \sim N(0, \sigma)$. The standard deviation of the resulting error, a, is used herein to characterize the extent of the position uncertainty.

Figure 9F:
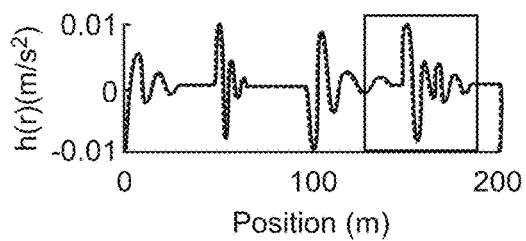
Figures 10A, 10B:
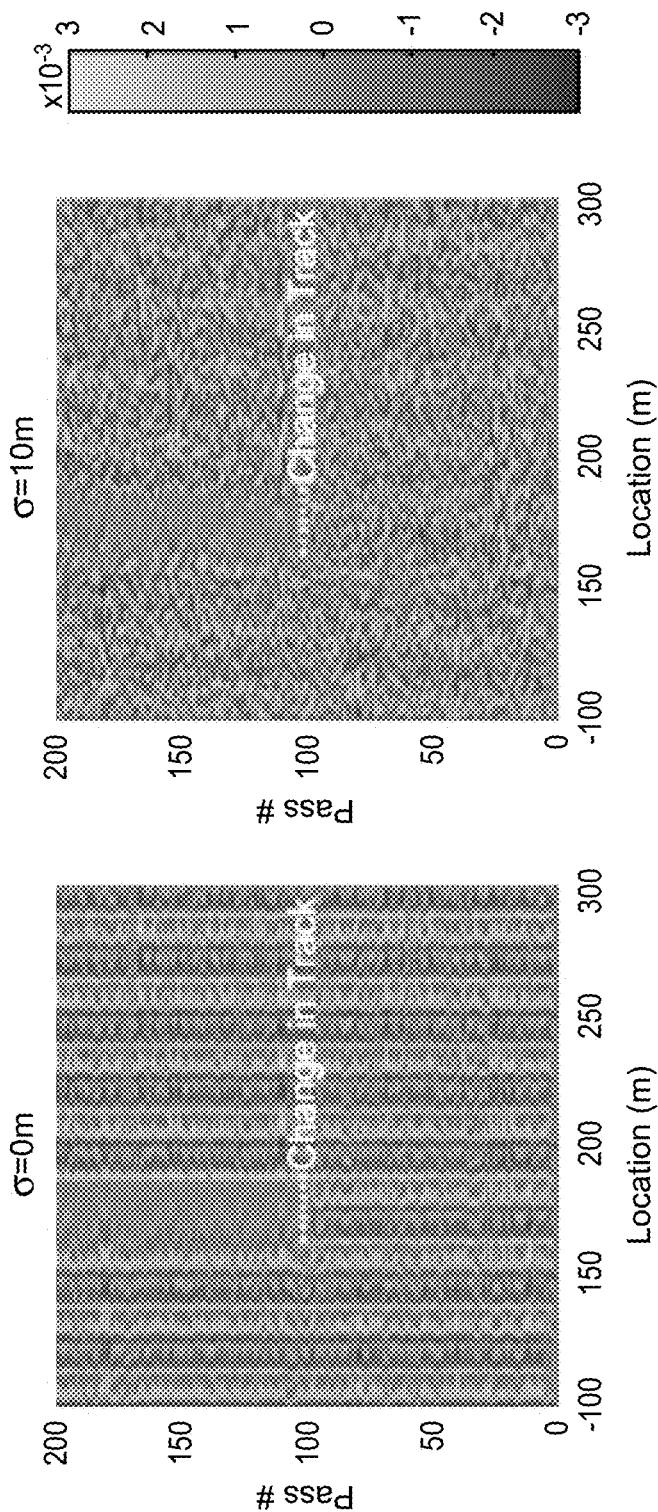
FIGS. 10A-B show the effect of position uncertainty

While in FIG. 9F the vibration signal for two passes in the spatial domain is shown, in FIG. 10A, 200 passes are shown, where each horizontal line is a vibration signal from a single pass, and the color is indicative of the instantaneous acceleration. Note that 100 passes are shown before the track change, and 100 passes after the track change from FIG. 3A. In FIGS. 9B and 9C, higher levels of position uncertainty are shown by varying the standard deviation of the error, σ. As the position uncertainty grows, detecting changes in the tracks becomes harder, although detection is still possible (even visually) for this type of a trivial track change.

In FIGS. 9E and 9F the vibration signal is shown, plotted spatially as a more intuitive signal representation given our interest in particular locations of track. The vibration signal provides excellent discrimination of track condition. Overall, the signal-energy feature is robust to position uncertainty for both types of track changes. This is particularly convenient as the signal-energy feature could potentially be universally applied in this type of monitoring system. In industry, the most common parameter for measuring track geometry is the standard deviation of the track profile, and signal-energy of the vibration signal is related to this parameter, as both involve squaring their respective data points. The relationship between the vibration signal and the track profile, given in Eqn. (1), is linear and time invariant, which means that the frequencies of the response are simply scaled versions of the frequencies of the roughness.

Change Detection

Having established that the signal energy of the vibration signal is sufficient for discrimination of track conditions, three change detection methods can be used to detect changes over time: (1) cumulative summation control chart (CUSUM); (2) generalized likelihood ratio (GLR); and (3) a Haar filter.

To evaluate each method, many passes of the train before and after a track change (varying the speed profile as in the previous simulation study) were generated. The signal-energy feature from the vibration signal was computed, then the data was extracted for a particular track location across all N passes. Although a number of change-detection approaches exist, many of them are designed for finding statistical change in a scalar quantity. For purposes of this invention, data from different passes of a moving vehicle was compared, so each pass was a vector. To format the data in a way useful for the general change detection approaches listed above, the value of the signal-energy feature at a specific location on the track, i, over all passes, n, was represented by building a matrix, F(n, i) where each feature vector $f_n^T$ becomes a row in the matrix (the superscript T indicates the transpose of the vector).

$$F(n, i) = \begin{bmatrix} f_1^T \\ f_2^T \\ \vdots \\ f_n^T \\ \vdots \\ f_N^T \end{bmatrix}$$

All three change-detection methods listed above effectively detected a change in the mean-value of the feature at a particular location of track compared to that value for a window (set number) of previous passes. Details of each will be presented briefly to explain how they are applied within the two dimensional feature matrix.

The cumulative summation control chart (CUSUM) method estimates the mean value over a window of previous passes (known as a sliding window), then compares the current (or most recent value) to the historic mean. If there is a succession of passes all deviating from the mean in one direction, it will trigger a detection event because it is likely that the mean has changed. Mathematically, the mean, Θ̂, is estimated from historical data over a window of w+1 previous points.

$$\hat{\Theta}(n, i) = \frac{1}{w+1} \sum_{k=n-w}^{n} F(k, i)$$

The difference between the current pass and the mean can be expressed by:

$$\theta(n,i) = F(k,i) - \hat{\Theta}(n,i)$$

This difference, θ, is added to a running sum of the differences.

$$g(n,i) = g(n-1,i) + \theta(n,i)$$

If the data varies from the mean consistently in one direction (positive or negative) intuitively the data has changed because the mean no longer represents the data. A change has been determined to have occurred when the magnitude of g exceeds a threshold, h, |g(n, i)|>h.

The generalized likelihood ratio (GLR) method looks for a change in the underlying distribution, and quantifies the log-likelihood that the recent data is derived from the historical distribution. If the recent data appears dissimilar from the historical data, then the approach will trigger a detection event. Mathematically, call a first window of data $y_0$, and a second window of data $y_1$.

$$y_0(n, i) = F(n-w-1; n-1, i)$$

$$y_1(n, i) = F(n : n+w, i)$$

The distribution of $y_0$ is defined by $H_0$ and the distribution of $y_1$ by $H_1$. We want to see the likelihood (l,[•]) that $y_1$ comes from the same distribution as $y_0$, $H_0$, versus the likelihood it comes from $H_1$.

$$g(n, i) = 2\log \frac{L[y1(n.i) | H1(n, i)]}{L[y1(n, i) | H0(n, i)]}$$

A change has occurred when g exceeds a threshold, h, i.e. (n, i)>h. In other words, beyond some threshold, the data is so much more likely to have come from a new distribution than from the historical distribution that we say a change in the data has occurred.

The Haar filter method finds the difference between the sum of recent data and the sum of historical data, triggering a detection event if the difference is too large. Mathematically, the difference between the two windows of data of width+1 can be written as $$g(n, i) = \left| \sum_{k=n}^{n+w} F(k, i) - \sum_{k=n-w-1}^{n-1} F(k, i) \right|$$

As in previous approaches, we say a change has occurred when g (n, i)>h. This approach tends to find locations where a step change has occurred between the two windows of data.

Each method relies on a sliding window of data: shorter-sized windows have the potential for detecting changes more rapidly after they occur, while longer windows allow for greater statistical significance. A window size of 20 passes was chosen, which would allow the system to detect a change within a week (assuming a few passes over the track per day). The results of applying each of these filters to the simulated changes can be seen in FIG. 11.

The results of each method applied to one example of each type of simulated track change are shown in FIG. 11. Successful change-detection filters should produce a high value after the change occurs at the same location in the track, and successful detection has been indicated with a red-box. Note that the change is not necessarily detected immediately, as it takes several passes after the change to build up statistical significance that a change has indeed occurred. All three approaches detected the track change on the left in FIGS. 11B-11D (with an ideal threshold), however, only the Haar filter was able to detect the tamping change in FIG. 11H.

CUSUM is perhaps the most versatile of the methods, as it could detect a gradual change in the mean over time, while GLR and Haar work best for abrupt changes in the data. In this case, the track change was assumed to have occurred over a short period of time, so the change is complete before the train passes over that section of track again. Given this assumption, GLR and Haar might be expected to perform better than CUSUM. GLR is more complex than the Haar filter as it involves not only the mean, but also the standard deviation in calculating the distribution of the data before and after the change. A change in variance could trigger a detection event, but it is unlikely in our application that high variance would be due to an infrastructure change, so GLR is less robust for this application. It is the simplicity of the Haar filter that enables it to consistently detect tamping along the section of track where it was simulated in FIG. 10H.

Figure 12A:
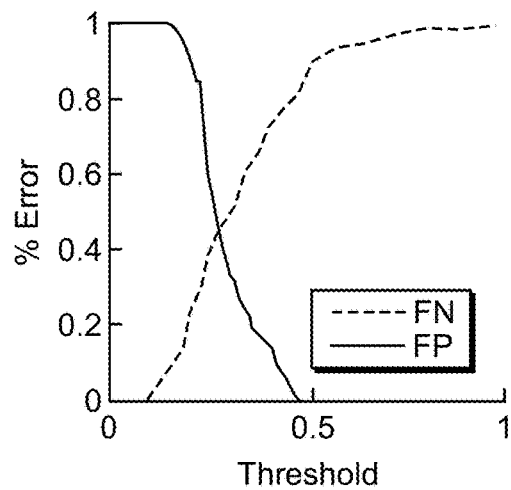
FIGS. 12A-C show the change detection results.

The success of each method was quantified over 100 simulated changes. A true positive was defined as a change detected within 20 passes and within 25 m of a true change. A false positive was a change detected outside of this window. False positives and false negatives were reported (true positives that were not detected) for a range of thresholds as shown in FIG. 12A, because selecting the appropriate threshold itself can be difficult. Methods to select the best threshold are not within the scope of the invention, so it is assumed that the ideal threshold was selected to see which change detection technique has the most potential. Assuming false positives, FP, and false negatives, FN, are equally bad, the threshold level that minimized the larger of the two errors was selected. This occurs where the false negative and false positive curves intersect as show in FIG. 12A. In other words, a threshold, h, was selected, where $$h = \underset{h}{\operatorname{argmin}}(\max[FN, FP])$$

To understand the trade-off in the change detection methods, 200,000 passes (2 types of track changes×100 track changes×100 passes×10 levels of uncertainty) were simulated. 100 track profiles were simulated for track changes and 100 track profiles for tamping changes. In this simulation, only the damping ratio and natural frequency values observed in the actual train system ($\omega_n$=2.5 π, ζ=0.2) were used.

Figure 12B:
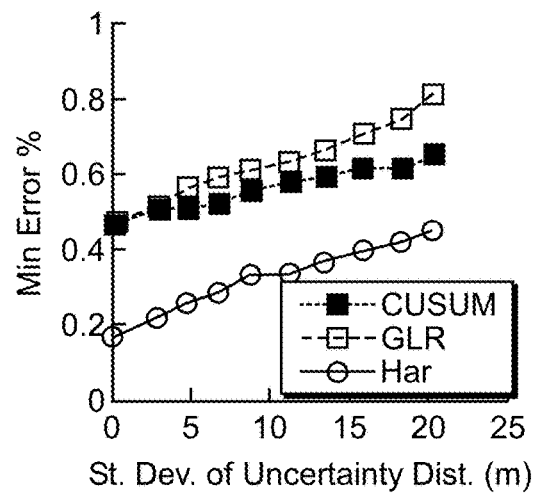
Figure 12C:
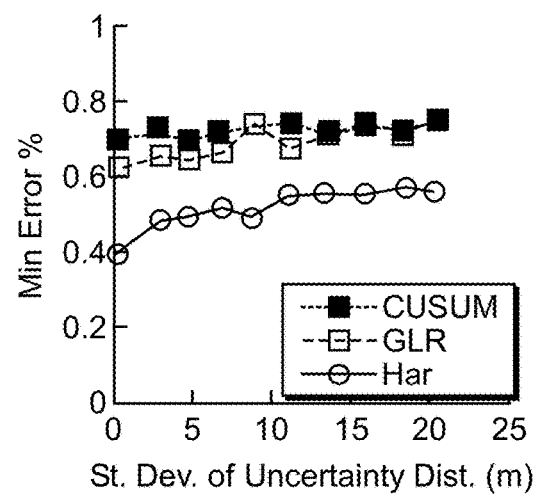

In FIG. 12B, the lowest error (i.e. ideal threshold) is reported for all change detection approaches on the track change simulation. While the error increased for all methods as position uncertainty increases, the Haar filter consistently performed the best. FIG. 12C shows the same error quantification but for the tamping change simulation, and again the Haar filters outperforms the other methods. Because tamping occurs over a larger section of track, position uncertainty matters less, so it is consistent that the Haar filter remains relatively unaffected by position uncertainty.

Validation on Actual Dataset

Figure 13:
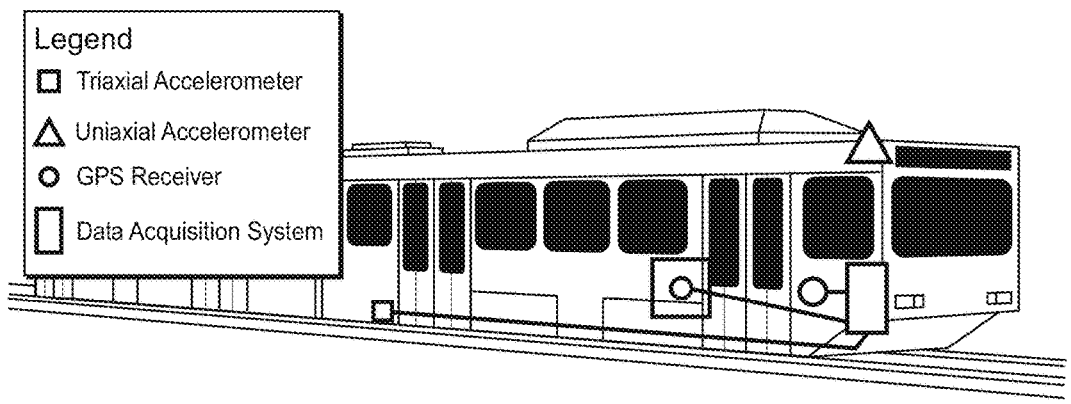
FIG. 13 shows the instrumentation of a light rail vehicle.

An extensive real dataset was collected over a two-year period. The sensors on the train were installed at the locations shown in FIG. 13. Two uni-axial accelerometers were placed inside the cabin of the train to measure vertical vibrations, one tri-axial accelerometer was placed on the central wheel-truck (bogie), and a BU-353 GPS antenna was mounted just under the roof. For purposes herein, only data from the accelerometer mounted inside the cabin above the front wheel-truck, a Vibra-Metrics model 5102 sensor, was used. The train car is a CAF light-rail vehicle that has an empty mass of 40 metric tons and a length of 27 m.

Data from hundreds of complete passes through the 30 km rail network were collected, sampling continuously from the GPS at 1 Hz and from the accelerometer at 1.6 kHz. One of the challenges in analyzing the data is handling the varying speed and the position uncertainty.

The simulations aimed to model the natural frequency of the train; a comparison between the simulated data and the collected data is shown in FIG. 14. While there is more noise at high frequencies in the measured data, as shown in FIG. 14C, both the oscillator and train have a natural frequency of around 1.25 Hz. The simple oscillator used herein does not attempt to model all the complexities of the train system. For example, the air-conditioning system is one of the biggest sources of noise within the train cabin. However, the train's primary response to the track roughness does appear similar to a single-degree-of-freedom oscillator.

Figure 14A:
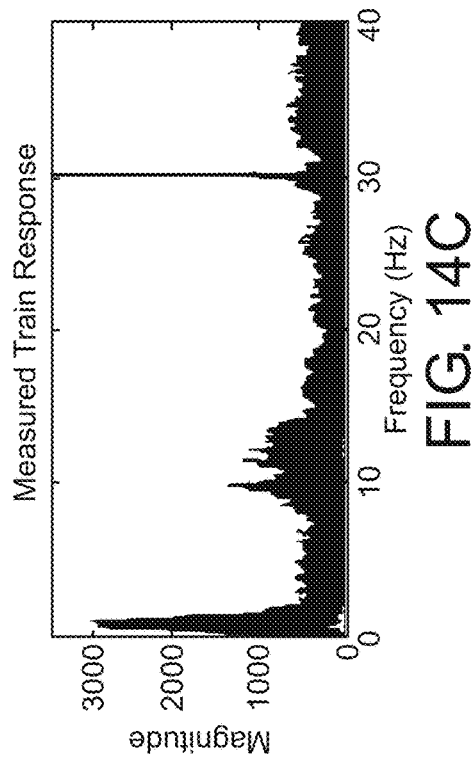
FIGS. 14A-D show the frequency response of the oscillator using both simulated data and data from operational train.
Figure 14B:
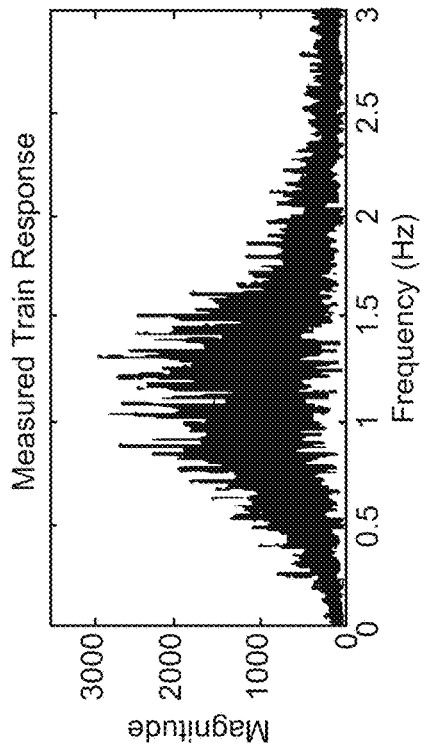
Figure 14C:
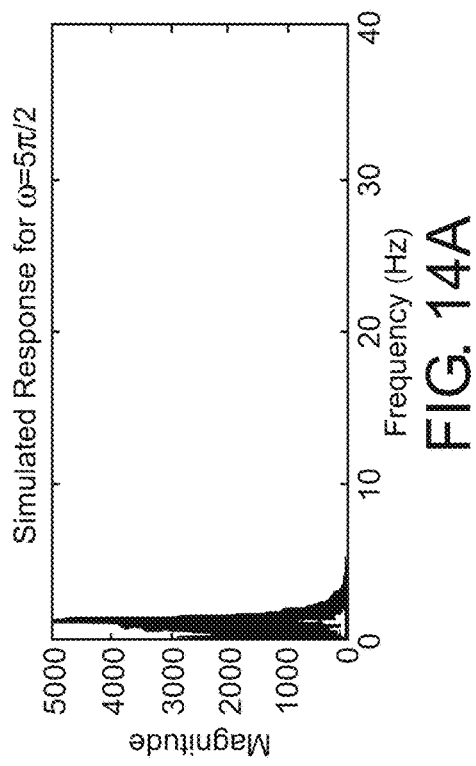
Figure 14D:
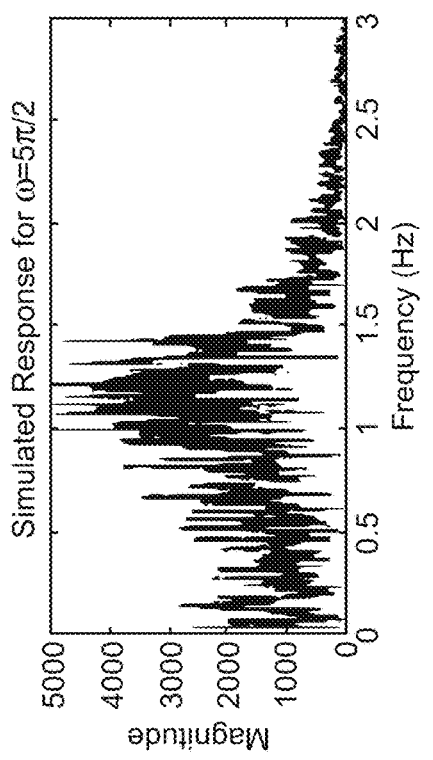
Figure 15C:
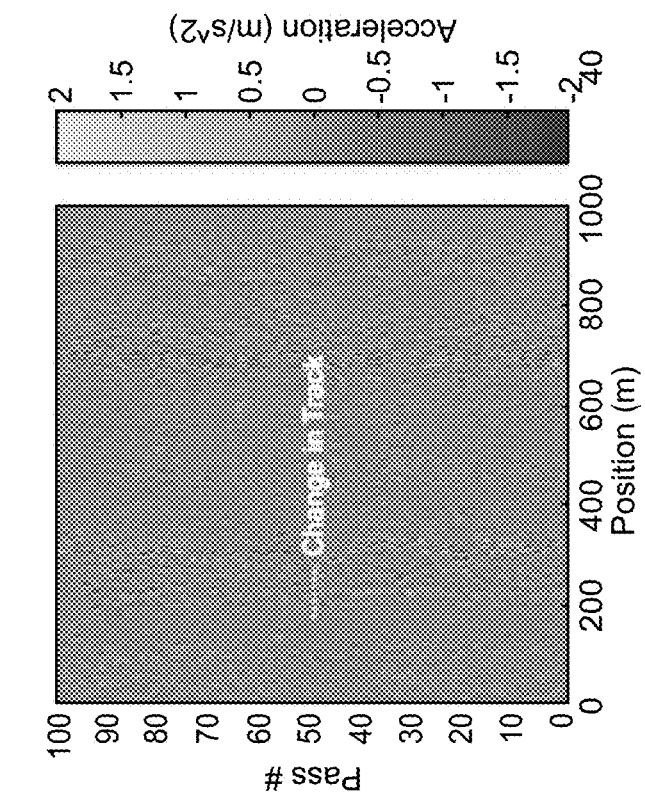
FIGS. 15A-C show spatial signals on pass before repair showing both the train speed and vertical vibrations from a sensor inside the train and after repair.
Figure 15A:
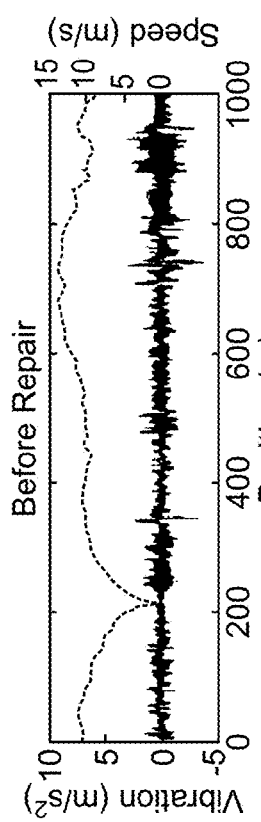
Figure 15B:
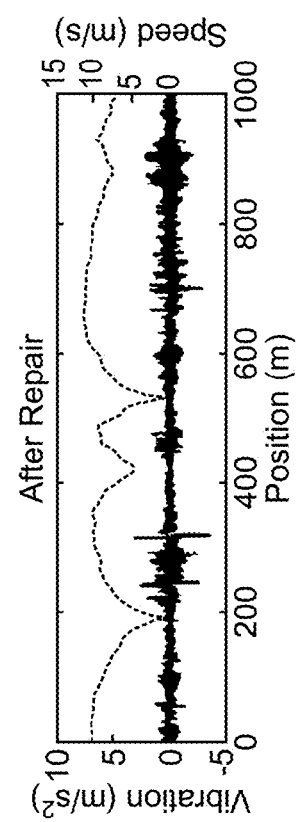

In one circumstance, the track in an old road-crossing was replaced. This known maintenance activity, where faulty track was replaced with good track, was used to test the signal analysis. FIGS. 15A and 15B show two characteristic passes of the train over the 1 km section of track. In the second pass, the train stops at two stations, the first at 200 m and the second at 520 m, whereas in the first pass it only stops at one of the stations (at 200 m). The train stops when there are passengers to pick up or discharge, which poses a challenge when comparing data between passes. One hundred passes over this section of track are shown in FIG. 14C, where the color indicates the value of accelerations recorded. Although difficult to see in FIG. 15, there is a high frequency vibration event when crossing a road at 220 m, an event which no longer occurs after the 50th pass, when the repair is done. It is much easier to see the change in FIG. 15 because signal-energy is a better indicator of track state. As the train crosses the road at 220 m, high signal-energy can be seen in FIG. 15A. This spike is absent in FIG. 15B or after pass #50 in FIG. 15C due to the repair.

Note as well that the first station stop in FIG. 15A occurs just after 200 m, whereas in FIG. 15B it occurs just before 200 m. This is likely due to the orientation of the train. The GPS is at one end of the train, and the train always stops at the same location within the station. If the orientation of the car changes, the position can differ by 27 m, the length of the car. Due to the sensor's location on the train, it will interrogate the tracks near the stations at different speeds. A sensor at the front of the train will travel quickly over tracks at the beginning of the station, and slowly over tracks towards the end of the station; the reverse is true for a sensor at the back of the train, adding to the difficulty of comparing data directly between different runs.

The ultimate goal of the project is to automatically detect changes in the infrastructure. As such, change detection is a vital step. The change detection methods discussed above were applied to the operational data. The results are shown with a basic threshold applied in FIG. 15. This figure mirrors the results in FIG. 10, where the raw data and all three approaches are shown. FIG. 16A shows the signal-energy feature for the track replacement change, and FIG. 16B for the tamping changes. FIGS. 16C-16H show the results of applying the three change detection approaches to each of these two changes, in which the red-boxes indicate the change-detection approach was successful.

For both types of track changes on the light-rail dataset, the Haar filter performed the best, reliably detecting both track and tamping changes, as shown in FIGS. 16D and 16H, as predicted by the simulation results discussed above. For the track-type change, CUSUM and Haar filter FIG. 16B and FIG. 16D respectively) could detect a change with zero error given the correct threshold. For the tamping change, CUSUM and GLR fail to detect the change at all. CUSUM fails because the variability in the sections with high energy (like the switchgear at 2500 m) are larger than the change from tamping itself, which occurs on low-energy sections of track. It is unclear why the GLR method has false-positives, although it could be due to the GLR's sensitivity to changes in variance as discussed earlier. It is important to note that the Haar filter succeeds in fulfilling ion e of the objectives of the invention, that being detecting changes relative to historical behavior, rather than simply detecting areas of the track that produce large vibrations. As a result, in the preferred embodiment of the invention, the Haar filter appears to be the best method of detecting change.

Sparse Data Approach

As the train travels along the tracks, the suspension filters the roughness of the track. Let u be the vertical displacement of the train, and r the vertical track profile. If the train suspension is modeled as linear, the relationship between the acceleration of the train ü and the track profile can be written as $$\ddot{u} = h * r \quad (1)$$

which is the forward formulation. Here, h is the impulse response of the train system and * is the convolution operator. ü, r, and h are all p-dimensional vectors corresponding to p points in time. If the properties of the train system are known, the roughness profile can be found through deconvolution. In the frequency domain (denoted by the hat symbol), this is written as:

$$\hat{r} = \frac{\hat{u}}{\hat{h}} \quad (2)$$

Most prior art methods that try to model the track profile explicitly use this inverse formulation. One goal of this approach is to preserve the computational efficiency of directly solving the inverse problem, while constraining the problem sufficiently so that a stable solution is found even if the exact transfer function is not known. Without knowledge of the precise transfer function, the precise track profile cannot be found, but as a trade-off, only the location and magnitude of the "bumps" or irregularities along the track can be identified. In this aspect of the invention, this is achieved by enforcing sparsity.

The first step is to find the train's transfer function and the track roughness that best approximate the measured vertical accelerometer data. This can be written as $$\min_{h,r} \left\| \hat{\ddot{u}} - \hat{H}\hat{r} \right\|_2 \quad (3)$$

where $\| \ \|_2$ is the $l_2$ norm, ü and $\hat{r}$ are p-dimensional vectors corresponding to the p observations, and $\hat{H}$ is a p×p diagonal matrix of the transfer function:

$$\hat{H} = \begin{bmatrix} \hat{h}[1] & 0 & \cdots & 0 \\ 0 & \hat{h}[2] & \cdots & 0 \\ \vdots & \vdots & \ddots & \vdots \\ 0 & 0 & \cdots & \hat{h}[p] \end{bmatrix} \quad (4)$$

Without constraints, this problem has trivial solutions: for example, H ^ could be the identity matrix and $\hat{r}=\hat{u}$, which would lead to a perfect solution. But nothing would be learned either about the nature of the track roughness or about the train system. Instead the track profile is constrained to a set of n discrete bumps, and the transfer function to model a single degree of freedom oscillator as seen in FIG. 6.

The vertical motion of the oscillator is governed by spring stiffness, k, damping, c, vehicle mass, m, and the roughness experienced by the train r'(t):

$$m\ddot{u}(t) + c\dot{u}(t) + ku(t) = c\dot{r}'(t) + kr'(t). \quad (5)$$

Here r'(t) can be found by interpolating r(x) the actual roughness profile (in the spatial domain) according to the train's position:

$$r'(t) = r(x)|_{x(t)}. \quad (6)$$

In the frequency domain, Eq. (5) can be written as $$m\omega^2 \hat{u}(\omega) + ci\omega \hat{u}(\omega) + k\hat{u}(\omega) = ci\omega \hat{r}'(\omega) + kr'(\omega), \quad (7)$$

which can be rearranged to define the transfer function, h, $$\hat{h}(\omega) = \frac{\hat{\hat{u}}(\omega)}{\hat{r}(\omega)} = (i\omega)^2 \frac{i\omega c + k}{-\omega^2 m + i\omega c + k} \tag{8}$$

where ω is the frequency and i=√−1. Returning to Eq. (3), we can now write the physical constrained we will enforce, $$\min_{h,r} \quad \left\| \hat{\hat{u}} - \hat{H}\hat{r} \right\|_2 \tag{9}$$

$$\text{subject to} \quad \|r\|_0 = n$$

$$\hat{h} = (i\omega)^2 \frac{i\omega c + k}{-\omega^2 m + i\omega c + k}$$

where n is the number of sparse bumps and $\|\cdot\|_0$ is the $l_0$ norm.

In minimizing Eq. (9), we find a sparse version of the track profile due to the '0 constraint which limits the roughness profile, r, to n non-zero values. In addition, the properties of the identified damped oscillator approximate those of the train's main suspension. It is important to note that the train is a far more complex system than the single degree-of-freedom oscillator used in this formulation; No attempt is made here to accurately represent the complete behavior of the train.

To solve this minimization problem, an expectation maximization approach was used to first solve for the transfer function then the roughness, repeating the process iteratively until convergence.

As the first step, a dictionary of possible transfer functions is created. Each transfer function is a vector, found by selecting values for stiffness, damping and mass then solving Eq. (8) for discrete frequency values. All vectors are placed into a dictionary matrix ^Dh. We then minimize $$\min_{\alpha} \quad \left\| \hat{u} - \hat{R}\hat{D}_h \alpha \right\|_2 \tag{10}$$

$$\text{subject to} \quad \|\alpha\|_0 = 1$$

where $\hat{R}$ is a diagonal matrix of the roughness profile in the frequency domain and α is a vector indicating the selected transfer function from the dictionary. Given the $l_0$ constraint, directly solving the problem is NP-hard As such, orthogonal matching pursuit, a computationally efficient way to select the optimal α is used. The transfer function is then updated using $$h = \widehat{D_h} \alpha.$$

As the second step, a dictionary of the possible roughnesses is created. It is desired to allow the solution to have a discrete bump at any point along the signal, so the dictionary is a collection of all the possible vectors with a single non-zero value. The result is the identity matrix. Because the calculation is done in the frequency domain, the dictionary is the Fourier transform, F, of the identity matrix, I: $\hat{D}_r$ =F(I), which is known as the discrete Fourier transform matrix.

$$\min_{\beta} \quad \left\| \hat{\hat{u}} - \hat{H}\hat{D}_h \beta \right\|_2 \tag{11}$$

$$\text{subject to} \quad \|\beta\|_0 = n$$

where β is the vector indicating the selected roughness bumps from the dictionary. We solve this problem using OMP as before. In this method, first the best bump (i.e. the bump which minimizes the $l_2$ norm) is selected, then the second best bump is selected, and the magnitude of each adjusted. This process is repeated up to the n allowed bumps. While the first bump is guaranteed to be optimal, the combination of bumps is not necessarily optimal. Given the results, this approach appears adequate for the task, and, as discussed previously, finding the optimal solution is not practical as the problem is NP-hard. The trade-off of not necessarily selecting the optimal combination of bumps is that the process is fast computationally.

Having determined β, the roughness is updated as $\hat{r}=\hat{D}_r\beta$. The process is iteratively repeated until convergence. Note that this process is expected to converge because in each step the $l_2$ norm error either decreases or stays the same.

The sparse approach was applied to a large data set collected from an in-service light-rail vehicle. The sparse approach can effectively analyze noisy data and detect changes in rail infrastructure.

Figure 17A:
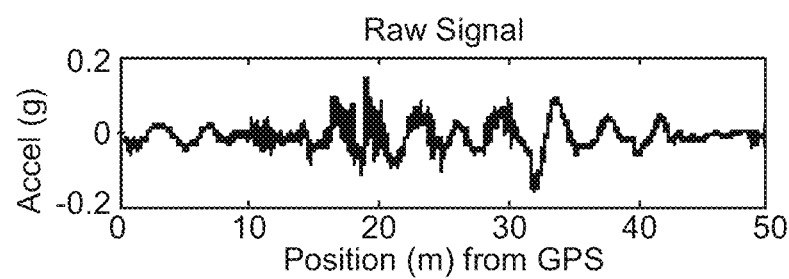
FIGS. 17A-C show an example of the sparse roughness identified in the process of sparse approximation.
Figure 17B:
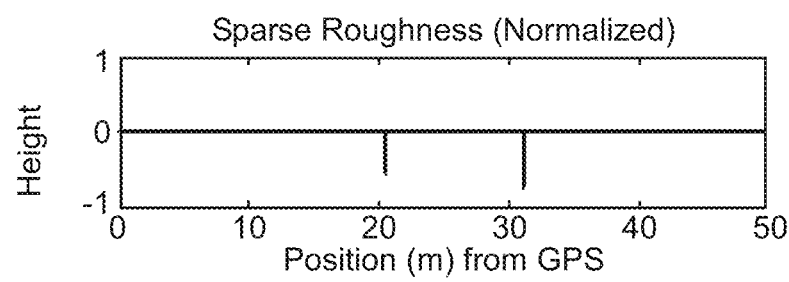
Figure 17C:
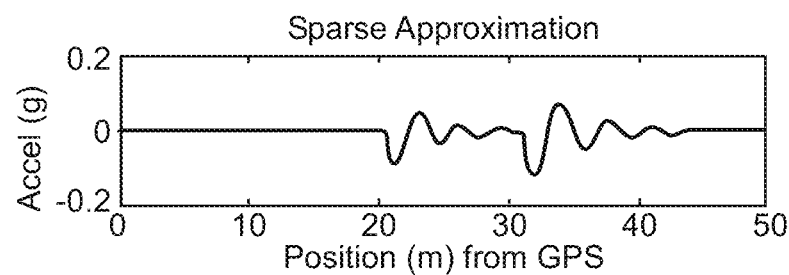

Data from one pass of the train traversing a 50 m section of track is shown at the top of FIG. 17. The vibration signal is plotted as a function of the train's position according to GPS. The signal is approximated using a sparse roughness profile with two bumps (middle) leading to the sparse approximation (bottom). Three signals, approximated in a similar fashion, are shown in FIG. 18. Each signal has the same distinctive pattern but the signals are not well aligned to one another due to GPS error. The sparse approach is applied to each signal, limiting the solution to two bumps, then iterating to convergence. The sparse approximations of the signals are shown in FIG. 8B. Note the similarity between the sparse signals. This is because the train travels over the same bumps with each pass, so it has a similar response. The sparse approximation effectively "denoises" the signal to find only the response to these most significant bumps.

The sparse solution overlaid over the raw data, as shown in FIG. 8C, lends insight into which part of the signal the sparse solution approximates most closely. Note that the sparse solution does not approximate the raw signal when the train is first excited, but rather has a sort of lag and approximates the latter part of the response to this excitation, which more closely resembles free vibration. When the train is first excited by a rough patch of track, the signal is noisy and depends on the shape of the roughness. Afterwards, the train's response more closely follows the response of a damped oscillator, so the signal depends on the parameters of the train. As the sparse solution tries to decompose the signal into track roughness and the train's response, it approximates the sections when the train's vertical movement most closely resembles free-vibration.

In essence, the sparse approach uses the latter part of a vibration event to characterize the train's properties, which can be viewed more broadly as a system.

Figure 19A:
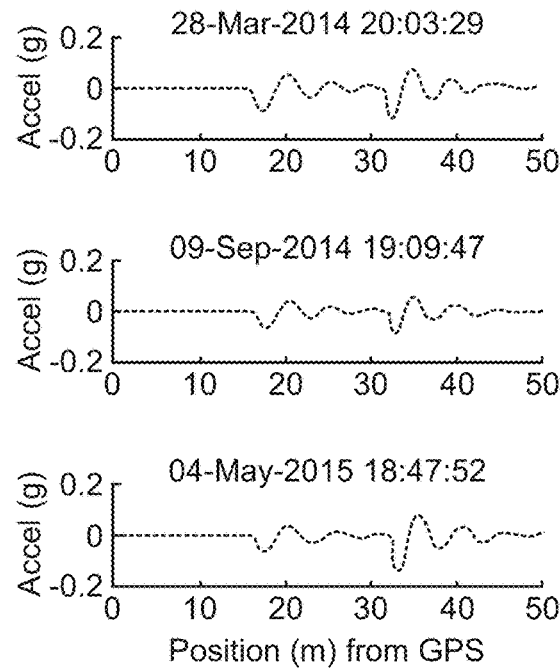
FIGS. 19A-B show aligned sparse and raw data.
Figure 19B:
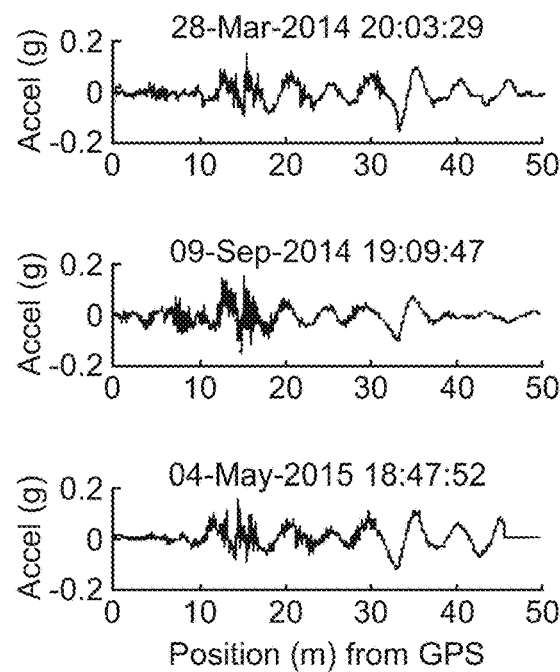

Returning to the monitoring problem, the location of the identified bumps in the track can be used to align the signals as shown in FIG. 19. This is accomplished by piecewise linear interpolation of the data so that the discrete bumps, shown in FIG. 17, occur at the same location for each pass. For these three passes, each looks similar after alignment, meaning the sparse approach has selected the same two bumps in the track from the signal (these are the bumps which minimize error). However, it is not guaranteed that the same two bumps will be selected from every signal. If different bumps are selected, alignment based on the bumps does not have a physical meaning. Such is the case with two of the three passes shown in FIG. 20.

Figure 20A:
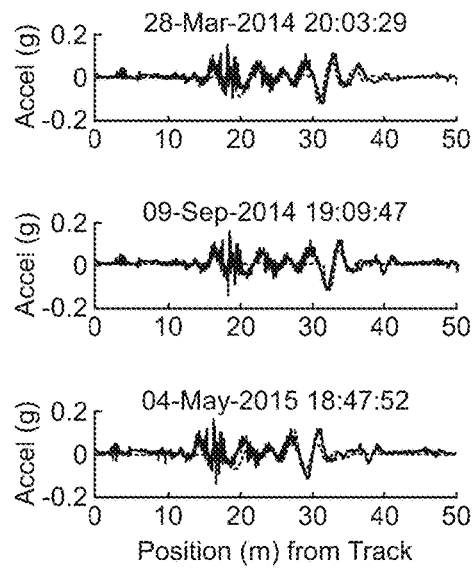
FIGS. 20A-C show an example of the sparse approach finding inconsistent bumps.
Figure 20B:
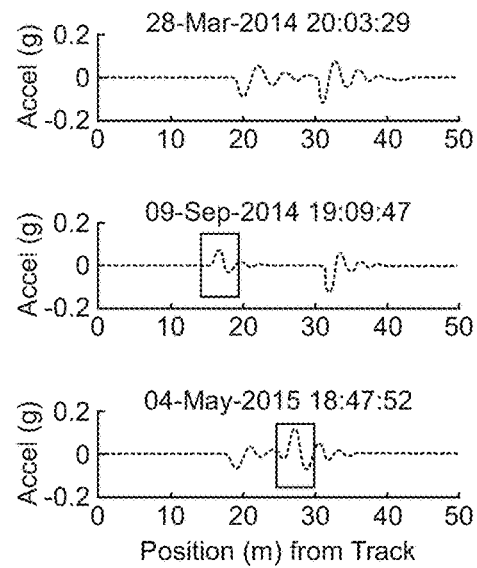
Figure 20C:
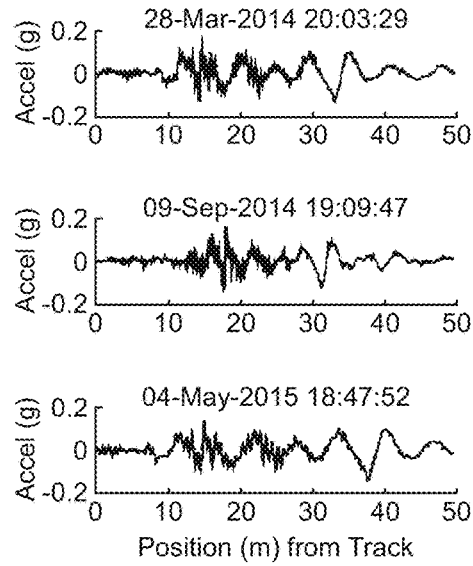

As discussed earlier, the sparse approach tends to model the train's free vibration response after an excitation event. However, if the excitation itself happens to be similar to the free vibration response (i.e. the excitation appears to be the first oscillation in a series of damped oscillations), then the selected sparse bumps are not consistent with the bumps found in similar signals. In FIG. 20, the sparse approximation of the 16-September signal matches the sparse approximation in FIGS. 18 and 19. For the 26-September signal, the first of the two sparse bumps fits the excitation rather than just the free vibration component. A similar phenomenon happens for the second bump in the 13-October signal. In FIGS. 18 and 19, the excitation is upward (positive), but the free-vibration response begins as the train accelerates downward (negative). The anomalous sparse vibrations in FIG. 20 appear upwards, as is highlighted by the blue boxes in FIG. 20B. Because inconsistent bumps are chosen by the sparse method, using these bumps for alignment leads to misaligned signals in FIG. 20C.

Figure 21A:
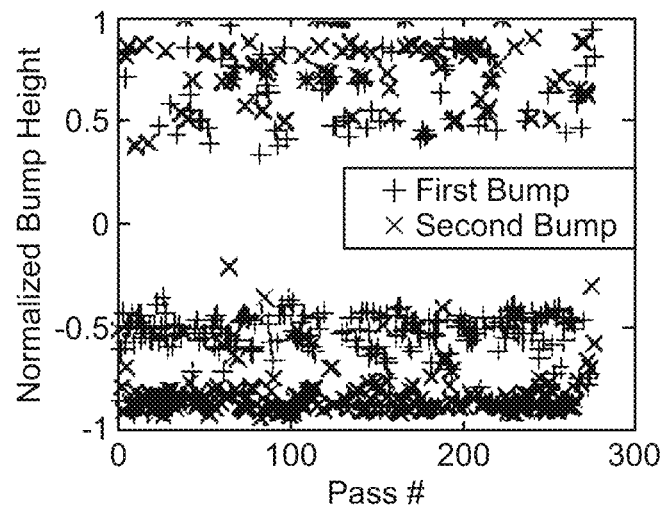
FIGS. 21A-B show the data after it has been cleaned using the found bump heights.

Fortunately, this inconsistency is easy to detect using the size and direction of the found sparse bumps. FIG. 21A shows the bump heights for all 267 passes recorded between February 2014 and June 2015. Note that, while solving the inverse problem, the transfer function could be very small and the bumps very large, or vice versa, so when comparing values between solutions, the bump heights need to be normalized. While the majority of signals have negative values for both of the bump heights, there are exceptions which follow the patterns explained in FIG. 20.

Figures 22A, 22B:
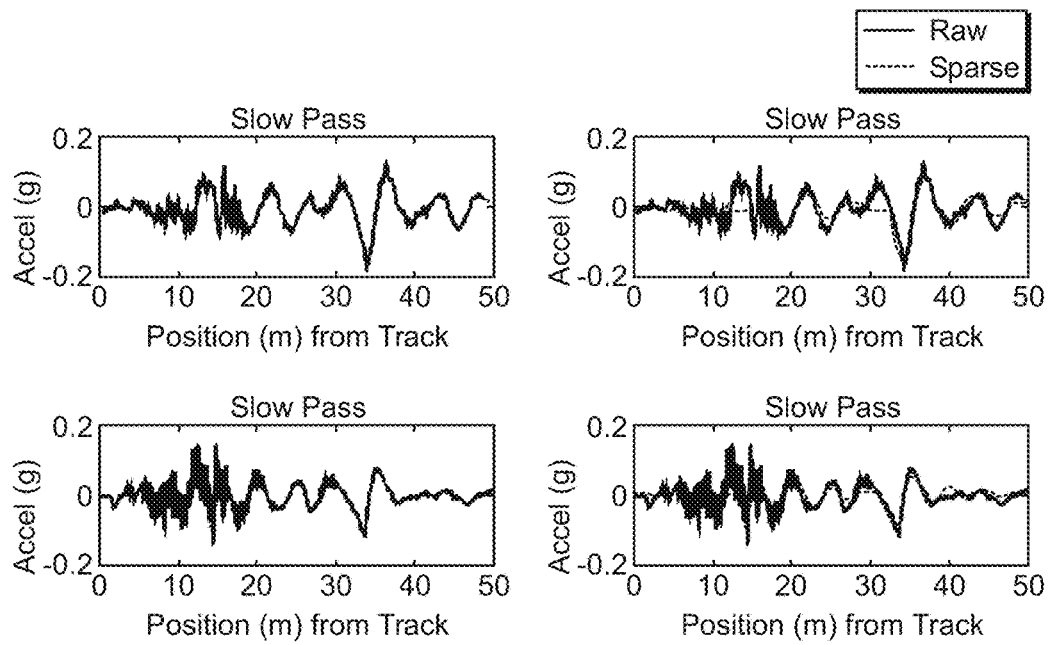
FIGS. 22A-C show the sparse approach applied to signals of different speeds.

One benefit of using an explicit model, such as the sparse approach, is that the train's variable speed is handled automatically by the way in which the problem is formulated. The success of the sparse approach in approximating signals from passes of different speeds is shown in FIG. 22. In FIG. 22A, two passes are shown, one where the train's average speed is 7.8 m/s and another where the average speed is 5.4 m/s. Note that the slow pass appears to have more high-frequency content. This is because the data is sampled at a constant rate in time (1.6 kHz), so slower passes have more samples per meter, and thus the appearance of more high frequency noise when plotted spatially. FIG. 22B shows the sparse approach applied to the two passes. In both cases, the approximations appear reasonable.

Figure 22C:
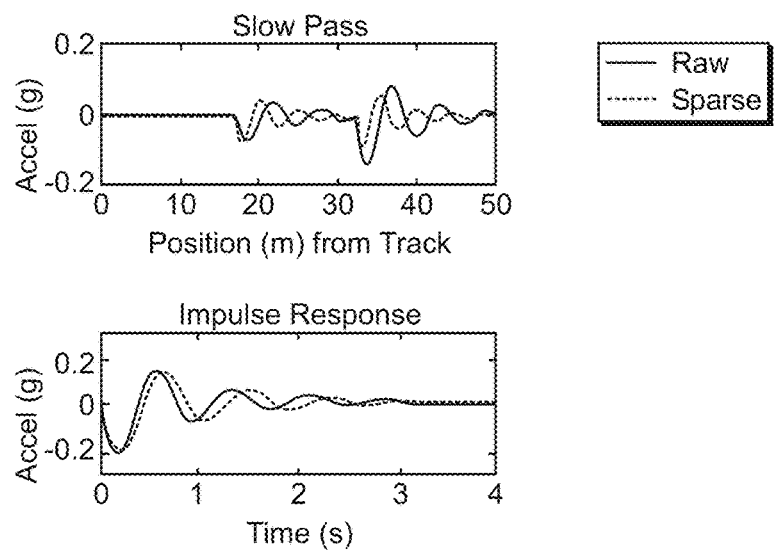

FIG. 22C showcases the flexibility of the sparse approach in modeling different speeds. When the train hits a bump in the tracks, the duration of each oscillation is relatively constant and depends largely on the natural frequency and damping of the suspension. This physical intuition is clearly seen in the bottom part of FIG. 22C, where the impulse responses of the systems found in analyzing the data are similar. However, in the spatial domain, the track distance covered during each oscillation depends on the train's speed, so the difference seen in the top figure of FIG. 22C is expected.

Figure 23A:
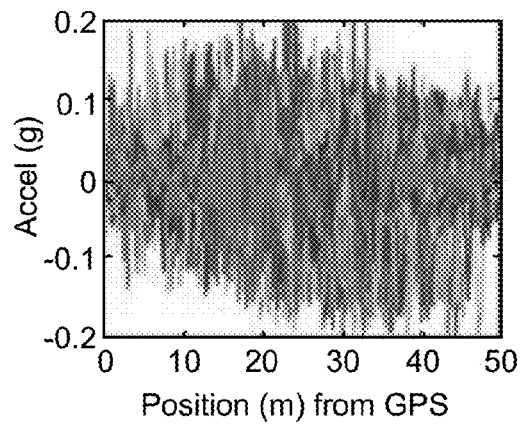
FIGS. 23A-C show the ability of the sparse approach to make sense of noisy data.
Figure 23B:
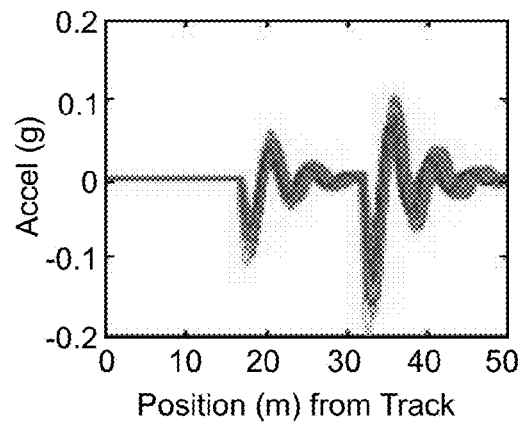
Figure 23C:
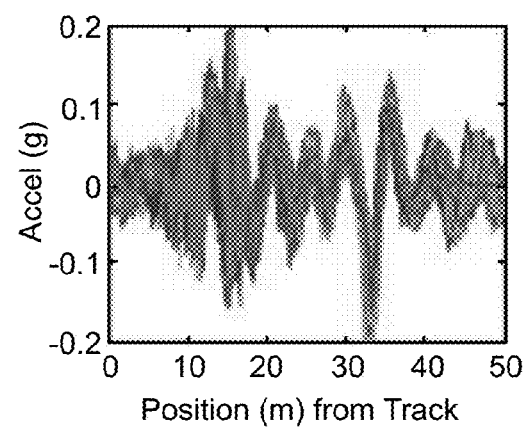

The success of the sparse method in making sense of noisy data is evident in FIG. 23. The 145 passes which conform to the pattern of interest are shown in FIG. 23A according to their recorded GPS position. As can be seen, this raw data looks unintelligible. The sparse approximation is then found for each, and aligned according to the position of the bumps as shown in FIG. 23B. This sparse approximation reveals underlying meaning in the noisy signals: the train gets excited by two bumps along the track as it travels. Finally, we can use the information from the bumps to align the original data, which is shown in FIG. 23C.

Figure 21B:
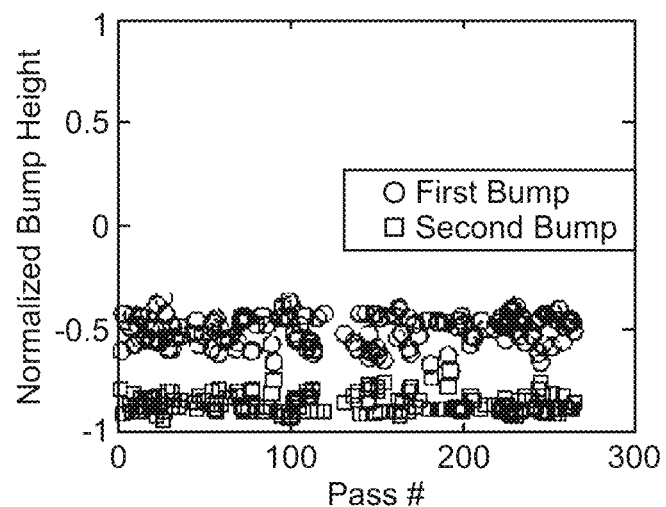

In this particular section of track, the pattern observed (two negative bumps) appears to occur throughout the monitoring period. This can be seen in FIG. 21, where the pass indices are arranged chronologically, and the 145 selected indices are evenly distributed 263 throughout the 267 total indices. For this particular 50 m section of track, no maintenance work was performed or requested by track inspectors according to the maintenance logs. Thus it is assumed that the consistency of the pattern over the 16-month period indicates that the tracks did not change significantly.

Detecting Track Change with the Sparse Approach

The type of change to be detected by the sparse approach has to do with a maintenance procedure called tamping, in which the ballast underneath the tracks is adjusted to improve track geometry. In this example, maintenance work is being detecting because it can be verified against work logs. However, just as the approach can detect the change from a state of misrepair to a state of good-repair, it could equally detect degradation from a state of good-repair.

Figure 24:
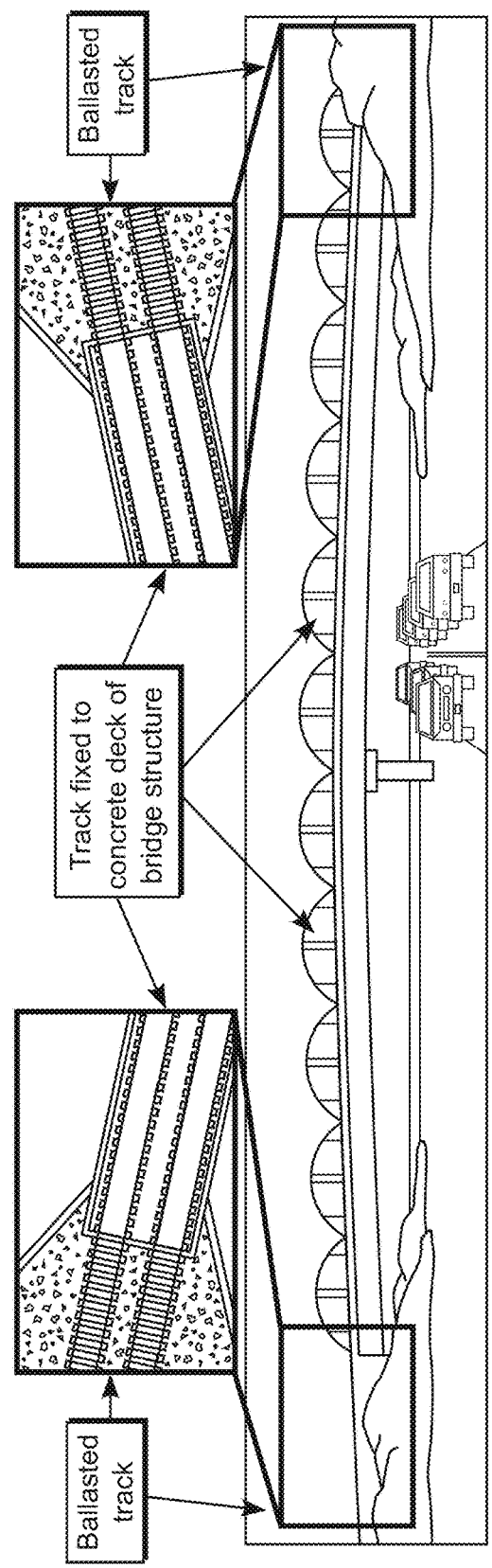
FIG. 24 are photos of a bridge structure that underwent tamping repair.
Figure 25:
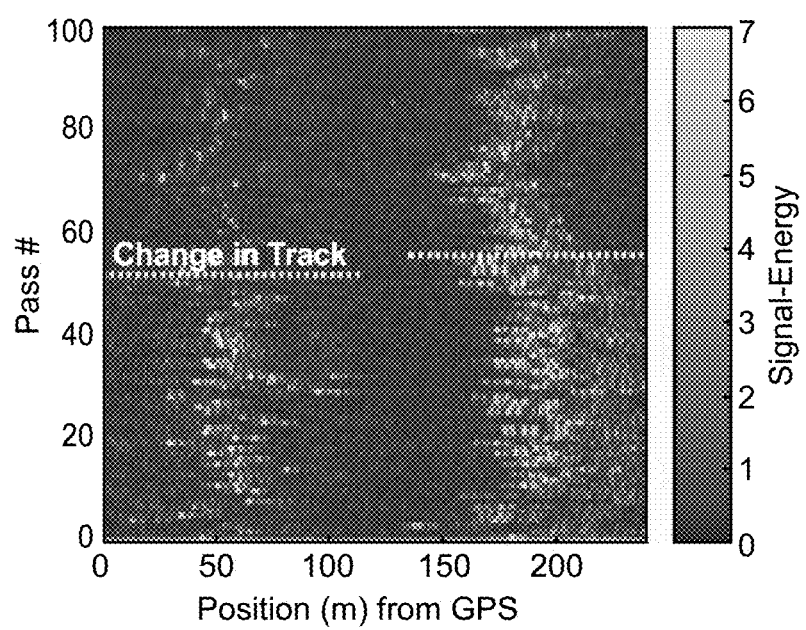
FIG. 25 shows the change in signal-energy due to tamping.

In September of 2014, maintenance workers tamped the ballasted tracks on both sides of a bridge structure shown in FIG. 24. The vibration data from this change was analyzed previously using the energy in the vibration signal, and the results are reproduced in FIG. 25. Unlike the sparse approach, which models the track state explicitly, the signal-energy approach models the track implicitly. Although there is less energy in the signal after the tracks are tamped (i.e. the train ride is smoother), it is unclear exactly what happened. Furthermore, because the track itself is not modeled, it is more challenging to align data given the position uncertainty from the GPS signal.

The sparse approach was applied to the vibration data collected in the instrumented car from February 2014 to June 2015 around the bridge of interest. Four example passes of the raw data are shown in FIG. 26A. The tamping activities occurred in late July 2014; two passes prior to tamping and two passes after tamping are shown. FIG. 26B shows the sparse approximation, which clearly exhibits two changes in the signal. In the first two passes, the oscillation due to the first bump is positive, in the second two passes, it is negative. The second change can be seen towards the end of the signal: the first two passes have an additional excitation after the second major bump, while the second two do not.

Figure 27:
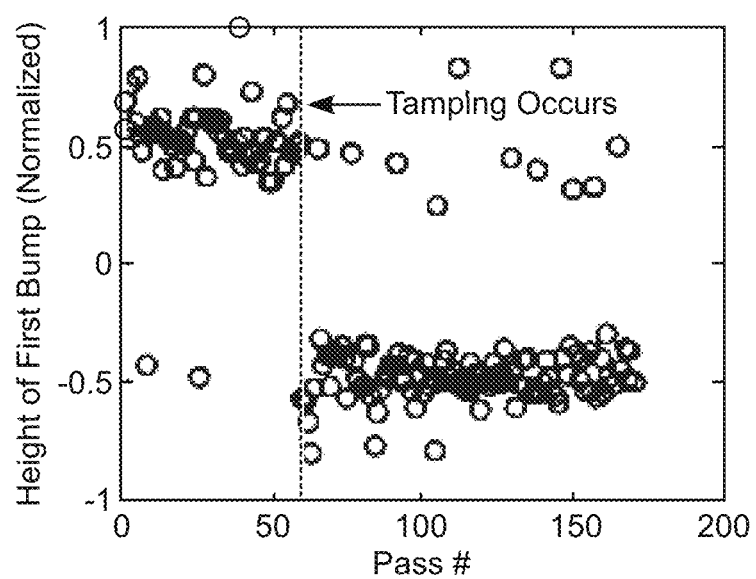
FIG. 27 shows the use of the height of the sparse bumps as an indicator of track height.

We can use the height of sparse bumps as a measure of the track height. As shown in FIG. 27, if only at the height of the first bump is examined, it changes dramatically after the tamping has occurred. If the goal was to classify the state of the track, (i.e. pre-tamping versus post-tamping) this could be done simply using the sign (±) of the first bump. In this case, of the first 59 passes, 57 would be correctly identified as pre-tamping (96% accuracy) and of the 108 remaining passes, 98 would be identified as post-tamping (90% accuracy). Overall, this would lead to an accuracy of 92% using just the height of one bump and a hard threshold; this is higher than the accuracy found for classifying the state of the track in which was 90% using data from a 500 m section of track and more sophisticated support vector machine classifier (SVM).

One remarkable aspect of the sparse approach is its ability to overcome the position uncertainty from GPS error. In the previous work, a high-dimensional feature was used from each pass: the signal energy at each point along the track. Longer feature vectors are required because the position is not known exactly. Using the sparse approach, a one-dimensional feature, the bump height, can be used, as it consistently models the same point in the signal despite the GPS error. Because of the simplicity of the feature, a threshold can be used successfully for the classification.

The real power of the sparse approach is not simply its ability to achieve high classification accuracy. It is its ability to provide insight into how the track has changed. The change from positive oscillations to negative oscillations as the train enters the bridge means that the relative heights of the track around the joint have changed. Before the tamping, the train would accelerate upward as it crossed the joint, meaning the track on the bridge side of the joint was likely higher than the track on the ballasted side. After the tamping, the train would accelerate downwards meaning the track on the ballasted side is likely higher now than the track on the bridge side. This type of information could be useful to inspectors. If this data were observed outside of a period of maintenance, it could signify, for example, that the bridge had settled. Such is the benefit of building an explicit model: the bumps, although sparse, directly relate to the shape of the track that most excites the train.

Data Fusion Approach

The goal of the data fusion approach is to estimate the state of the tracks. Level 1 Fusion is performed, combining features extracted from the raw signal. In this application, the estimated track state is a feature representation of the state of the tracks; if the fusion is successful, the resultant feature representation is a more accurate and consistent feature representation than is extracted from any individual sensor. Ideally, data from as many sensors and as many trains as possible is incorporated, while weighting the information for each according to how reliable it is believed to be. To accomplish this, a data processing pipeline that incorporates state estimation elements from a Kalman filter is proposed.

The Kalman Filter, shown in FIG. 28, provides an estimate of the current state of a system by combining current and past data collected about that system. It is one of the most popular data fusion techniques because it is computationally efficient, works in on-line applications, and produces accurate estimates. For a linear process where the noise is zero-mean, the estimate is optimal. As an example, let $x_k$ be a vector describing the state of a linear system, $$x_k = a x_{k-1}, \quad (1)$$

at time-step, k. The goal is to estimate state at each time-step from a set of noisy observations acquired from j sensors, $z_{k_j}$ (also a vector), $$z_{k,j} = x_k + \varepsilon, \quad (2)$$

where $\varepsilon$ is some zero-mean noise.

The Kalman Filter can be used to find an optimal estimate of the system from these observations, assuming the linear process (i.e. the value for a) is known. The steps for one iteration of the most basic Kalman Filter are shown in FIG. 28; these steps are repeated each time new information is collected. Herein, bold letters are used to denote vectors, and hat symbols (^) to denote values that are only estimates of the true values. First the estimate of the state of system, $\hat{x}_k$, is predicted from the state at the previous iteration, $\hat{x}_{k-1}$, multiplied by the known constant of the linear process, a, as shown in Eq. (3). The prediction error variance $p_k$ provides an estimate of how much the prediction from the previous step can be trusted; this too is updated in Eq. (4).

While Eqs. (3) and (4) provide an a priori estimate, Eqs. (5-7) provide an a posteriori estimate, and thus are categorized under a new heading, "Update." The first step is to estimate the Kalman Gain, $k_{k,j}$ for each of the j sensors which controls the trade-off between trusting the estimate from the last iteration versus trusting the newly observed data. This "trust" level depends on both the prediction error variance, $p_k$, and the sensor variance, $r_j$. Eq. (6) then provides the updated estimate including the newly observed data, $z_{k,j}$. Finally the a posteriori estimate of the prediction error, $p_k$, is calculated in Eq. (7).

For the case of track monitoring, there are three application specific insights which we incorporated into the data fusion process. First, the observed data must be aligned so that it fits more closely with the previous estimates. For a variety of reasons, the GPS position of the train can differ from the true position. This error tends to be relatively constant for a given pass over a section of track. Both the state estimate for the $k^{th}$ pass, $\hat{x}_k$, and the observed data for the $k^{th}$ pass, $z_{k,j}$, from the $j^{th}$ sensor, are vectors describing the state at discrete locations along the track. If the data is not well aligned, then combining these vectors, as is done in Eq. (6), does not make sense, as discrete values referring to different sections of track might be combined. To circumvent this problem, the first step of the method proposed herein, shown in FIG. 29, is to align the observed data with the estimate of the state of the tracks. The offset is determined using cross correlation in Eq. (8), then provide an estimate of properly aligned observed data, $\hat{z}_{k,j}$ in Eq. (9).

The second insight has to do with how the sensor variance can be estimated for each sensor and each pass over a section of track. Typically the error level of a sensor is constant over an entire pass. For example, if the sensor is malfunctioning, the data is not useful over the entire pass. Conversely, if the data appears similar to previous readings over the first half of a section of track, the second half also tends to match historical data. Thus, we calculate the sensor variance at each stage according to the variance between the observed data over the entire pass and the estimate of the track state over the entire length of the track section as shown in Eq. (10). It should be noted that the majority of adaptive Kalman filters proposed in the literature also present novel methods for estimating sensor variance, so this innovation follows a trend in the literature.

Eqs. (11-13) in the proposed algorithm follow closely from Eqs. (5-7) in the standard Kalman filter, so require little explanation. Eqs. (3) and (4) from the standard Kalman filter have not been reproduced because in our application, the state of the tracks is predicted to remain the same over time, so a=1. Thus, $\hat{x}_{k-1}$ is used in Eqs. (11-13) rather than $\hat{x}_k$, as is used in Eqs. (5-7).

The third insight is that, while the state of the tracks is estimated to remain constant, it could change at anytime. Because of this, the prediction error should never be zero, which would mean that the Kalman filter would trust only its prediction and ignore the newly observed data. In the standard Kalman filter, the prediction error $p_k$ asymptotically approaches zero; to avoid this, we set a minimum level for $p_k$ which we refer to as $p_{min}$. As will be discussed in the next section, determining the optimal value for $\Box_{min}$ is an important component of implementing our data-fusion approach. If $p_{min}$ is too small, then the model updates slowly after a change in the tracks; if $p_{min}$ is too large, the filter is sensitive to noise in newly collected data.

To test the proposed data fusion approach, the algorithm was applied on simulated data. As mentioned above, the data-driven approach could be applied to fuse a wide variety of features; one of the benefits of testing the approach in simulation is that more generic data can be generated and tested to show the generality of the approach. In addition, in simulation, the ground truth is known, so the performance of the approach can be readily quantified. This is important, not only for judging the efficacy of the approach, but also for parameter selection. For example, we can determine the optimal value of $p_{min}$ by finding the value which minimizes the error of the output relative to the ground truth.

Data Generation

Figure 30A:
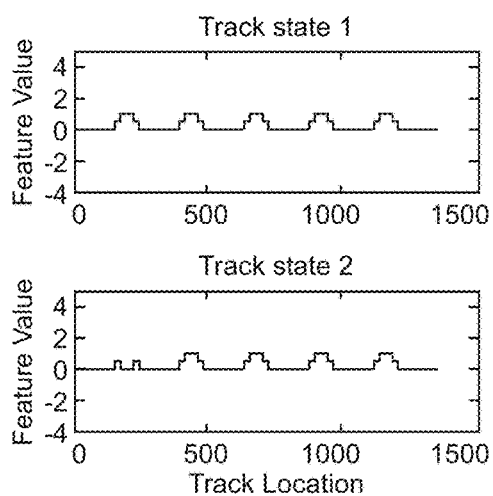
FIGS. 30A-B show true feature representation of track state and observed feature representation of track state.
Figure 30B:
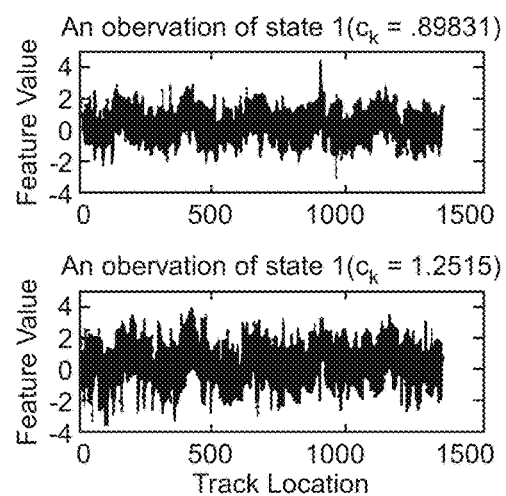

We simulate some feature vector over the length of the track in two different states as shown on the left of FIG. 30; this is a feature representation of the ground truth state, $x_k$. The change between state 1 and state 2 symbolizes some sort of track deterioration or maintenance which would cause the tracks themselves to change.

The right side of FIG. 30 shows two examples of the observed features from the train. This is simulated by adding a random offset $m_{k,j}$ to the true feature state, $x_k$, along with some noise scaled by a value $c_k$ which is constant for each pass, $$z_{k,j}[n] = x_k[n + m_{k,j}] + c_k \epsilon[n], \quad (14)$$

where $$m_{k,j} \sim \mathcal{U}(0, 50)$$

$$c_k \sim \mathcal{U}(0, 2)$$

$$\epsilon[n] \sim \mathcal{N}(0, 1).$$

Here, U(a,b) indicates a uniform distribution between a and b, while N (μ, σ) indicates a normal distribution with mean μ and standard deviation σ. Note that m is the offset representing GPS noise, and $c_k$ scales the noise in each pass determining if the observed data is accurate or noisy. Due to the low signal-to-noise ratio (less than 0.1 for some passes), determining the state of the tracks from a single pass provides an inaccurate estimate. However, in the case of train-based monitoring, particularly if several trains are instrumented, numerous passes can be collected, and the data from each pass fused to achieve a better estimate.

Figure 31A:
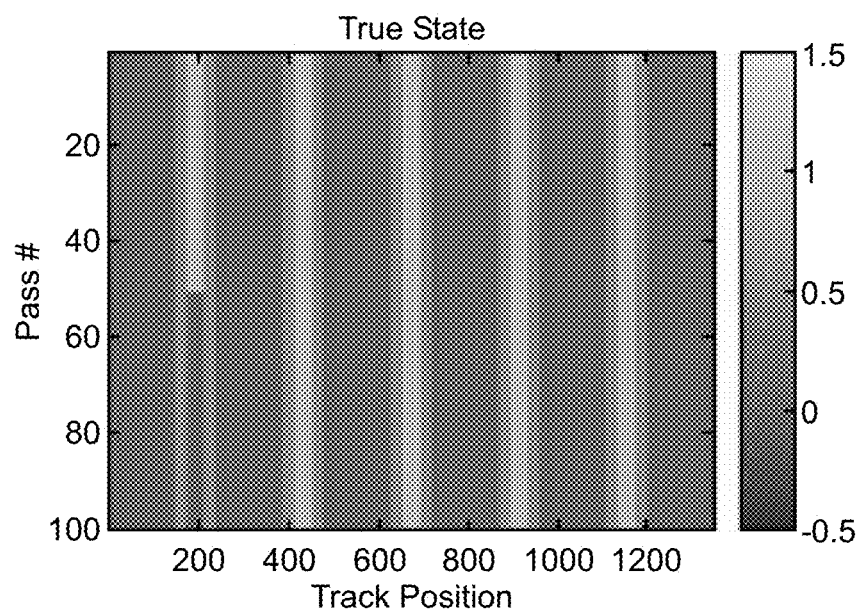
FIGS. 31A-B show the true state of the tracks and the observed state of the tracks, in terms of extracted features.
Figure 31B:
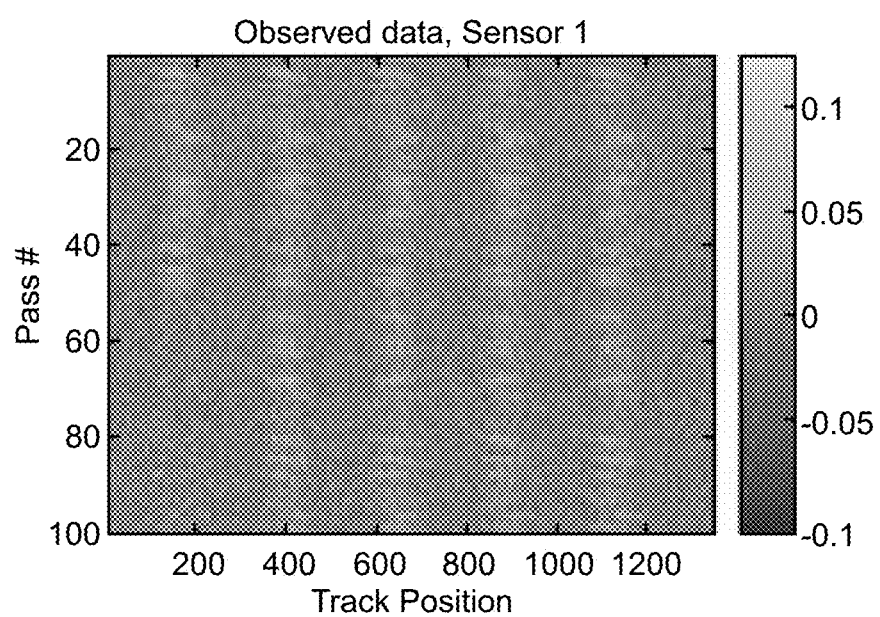

FIG. 31 shows 100 simulated passes over the track section of interest, assuming that for the first 50 passes, the track is in state 1, and for the second 50 passes, the track is in state 2. In FIG. 31A, the true state, $x_k$, is shown for k passes where k=[1, 2, . . . 100], while in FIG. 31B, the observed data for one of the j sensors is shown $z_{k,j}$. In this simulation, assume two sensors (j=[1, 2]) on a single train, so $c_k$ is the same in both cases. This makes the fusion more challenging, because if one sensor is noisy, the other sensor is also noisy, so the estimate for that pass must rely more heavily on the estimate from the previous passes. Note that the observed data has been normalized such that the length of the vector is equal to 1: this is beneficial because noisy passes tend to have larger amplitudes (in both this simulation and in the data we have collected from our instrumented trains) so normalization helps by reducing the magnitude of these noisy passes.

Data Fusion

Figure 32:
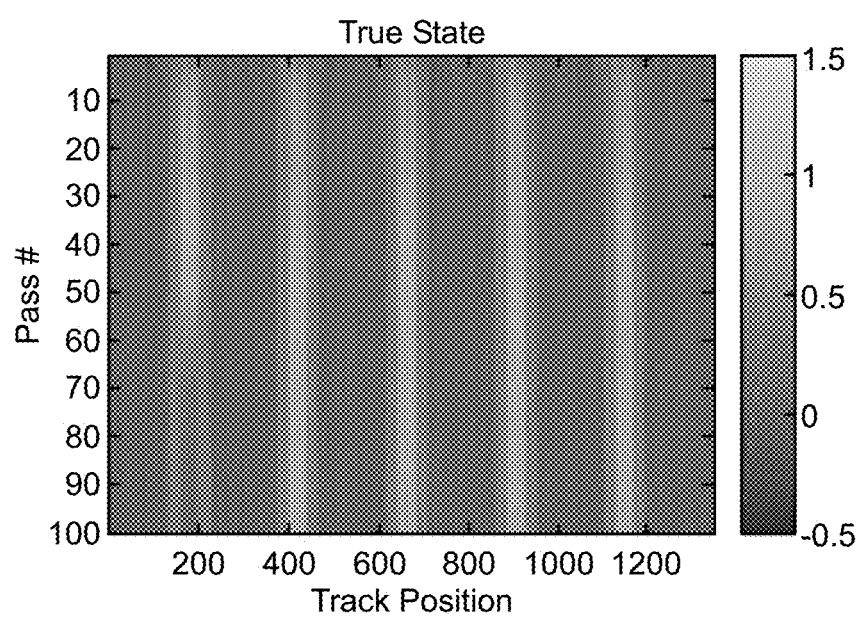
FIG. 32 shows an estimate of the state of the track using the approach of to present invention.
Figure 33A:
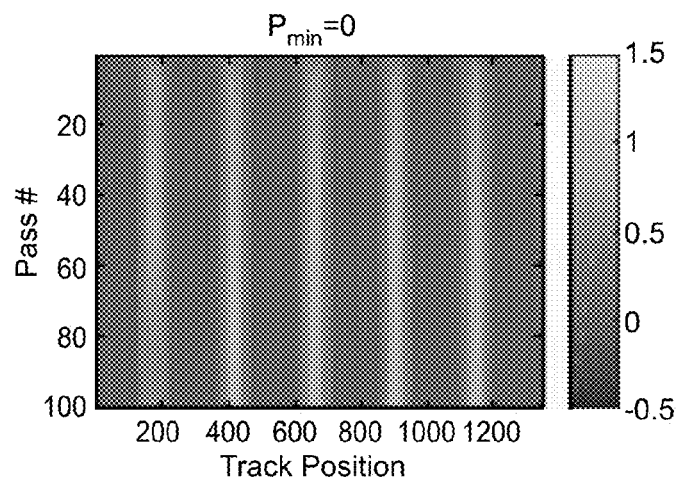
FIGS. 33A-C show the outputs of the data-fusion pipeline with varying values of $p_{min}$.
Figure 33B:
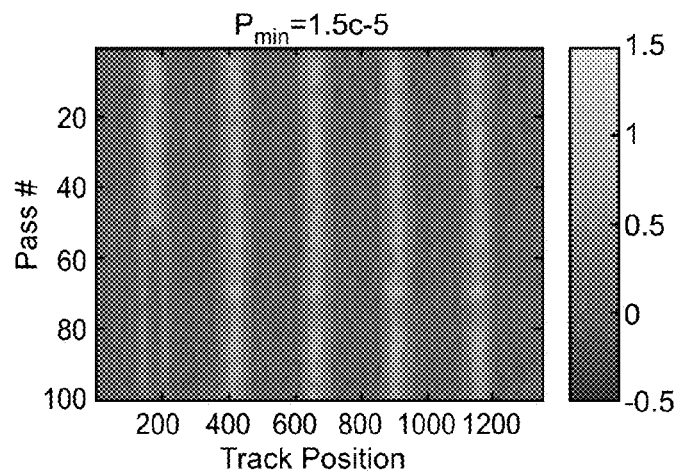
Figure 33C:
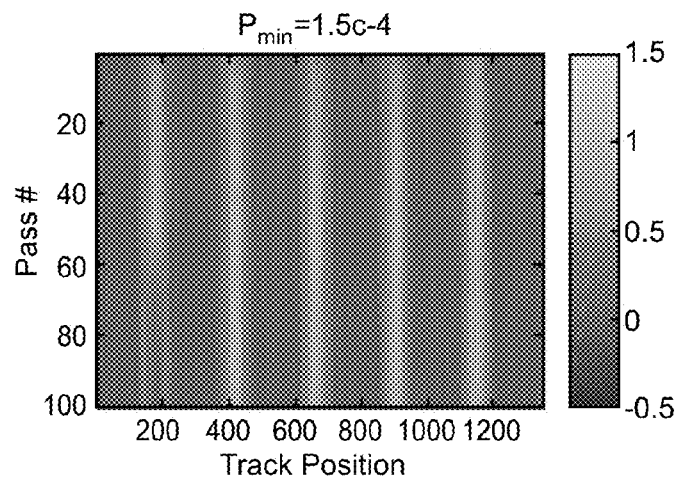
Figure 34:
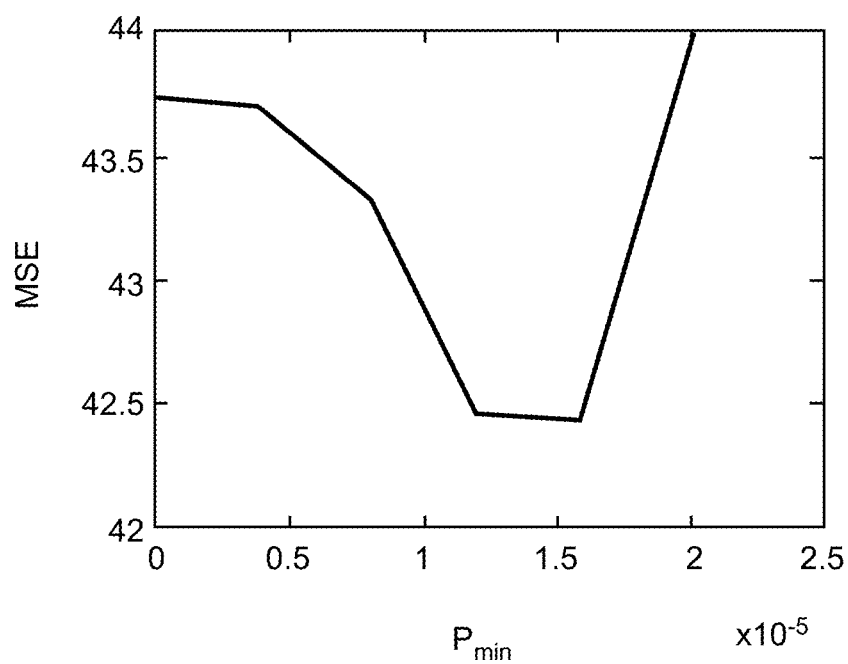
FIG. 34 shows the effect of varying the value of $p_{min}$ on the prediction of the data fusion approach.

The approach presented in FIG. 29 can be applied on the simulated data shown in FIG. 31B. The output, the estimate of the state of the tracks, is shown in FIG. 32. This figure bears remarkable similarity to the true state of the tracks shown in FIG. 31A, meaning the fusion approach is largely successful. Notice for the first several passes, the estimate is not good, but by around the 20$^{th}$ pass, the filter produces an accurate estimate of the state. Immediately after the change from state 1 to state 2 at pass #50, the filter is slow to adapt to the change. The trade-off between adapting quickly to changes versus making the most accurate estimate of the track if it is in steady-state is controlled by the chosen value of $p_{min}$ in the proposed Kalman filter. In this example $p_{min}=1.5\times10^{-5}$ was chosen. Other values can be seen in FIG. 33.

When $p_{min}$ is zero, the filter approaches a steady-state where it no longer considers new inputs; when $p_{min}$ is larger, it never trusts its estimate too strongly, so is susceptible to newly observed data which is potentially noisy. Because the ground truth feature state of the tracks is available, the optimal value for $p_{min}$, that is the value of $p_{min}$ which minimizes the mean squared error (MSE) between the estimated feature state and the true feature state, $\Sigma k \|x_k - \hat{x}_k\|2$ can be determined. A plot of the MSE for various $p_{min}$ values is shown in FIG. 30, revealing that $p_{min}=1.5\times10^{-5}$ is approximately optimal.

In addition to setting a minimum value for $p_k$, there are two other novel components of the data fusion algorithm which can be evaluated. The first is the estimation of the position error (or o set) using the cross correlation of the observed data with the estimated state from Eg. (8). FIG. 35A shows a comparison of how well the estimated o sets match the simulated o sets for one of the two simulated sensors, truncated to show only the first 20 passes for clarity. The true o set and the estimated o set do not line up well for the first several passes because the estimate of the current state of the tracks is not accurate. By the 4th pass, the estimated o set and true offset line up closely.

The second parameter estimated is the sensor variance, a measure of the noise in the data. When generating the data for this simulation, the noise in each pass was multiplied by a constant, $c_k$ shown in Eq. (14), as a way of representing the fact that the noise level tends to be constant for each pass. The noise level is approximated using Eg. (10) by calculating the variance between the feature state estimate and the observed feature. In FIG. 35B both the estimated sensor variance and the amount of noise which was originally added to the simulated data are shown. Although the values themselves are quite different, both parameters follow a similar trend. One interesting phenomenon is the interplay between the amount of added noise and estimated o set. Notice for pass #13 the value of $c_k$ is high; at the same pass, there is a difference between the estimated o set and the true offset in FIG. 35A, likely due to large amount of noise. If the estimated o set is incorrect, then the data is not properly aligned (in Eg. 9) so we might expect the estimated sensor variance to be higher. However, the sensor variance does not appear to increase dramatically because the features we are fusing together are relatively smooth over the length of the track. If the feature was less smooth, our approach would be more sensitive to misalignment.

Validation on Operational Data

The data fusion approach presented herein was validated on a real data set collected from a light-rail network. This data set is convenient for exploring data fusion because two trains were instrumented over a number of years. To evaluate the data fusion approach, data from a section of track where a faulty joint was repaired is analyzed; the goal is to see if the proposed data fusion approach helps to detect this repair more accurately and more rapidly than by detecting the change directly from any individual sensor.

25 months of data are available from a first train and 10 months of data from a second train. The goal was to build a system that could be widely deployed. Low-cost off-the-shelf components were selected most of the sensors were placed inside the cabin where they were easy to install and protected from the elements. Data from two uni-axial accelerometers mounted vertically on both trains was used, all of which are Vibrametrics model 5102 ceramic shear accelerometers. In addition position GPS data was obtained from BU-353 antennas placed just under the roof of the first train. The vibration data was sampled at 1.6 kHz from the accelerometers on the first train, and at 2 kHz from the accelerometers on the second. On both trains, position data is sampled at 1 Hz from the GPS antennas.

One of the challenges in this study is that GPS units are low-cost (<$40), do not have differential capabilities, and do not have an obstructed view of the sky. Together, these factors lead to low-accuracy position estimates. While this makes analysis a challenge, it also means that the techniques are general for many systems even if the position estimate is poor. For the interpolation in this paper, we sampled at a rate of 1.5 points per meter. For our analysis, we consider a 1 km section of track; thus the observed data vector of the extracted energy feature, $z_{k,j}$, for each of the k passes and j sensors has a length of 1500.

The energy feature data for the each of two sensors mounted on both trains is shown in FIG. 32. Each horizontal line represents one pass where the color indicates the value of the feature. As in the simulation, each pass vector is normalized so it has a length of 1. By plotting each successive pass under the previous pass, certain patterns of vertical lines emerge; this occurs because certain hardware in the tracks, like the two pieces of switch gear around 0.6 km, consistently cause high vibrations. These vibrations result in large energy feature values. These vertical lines are not perfectly straight because of position uncertainty due to GPS error.

Figure 37A:
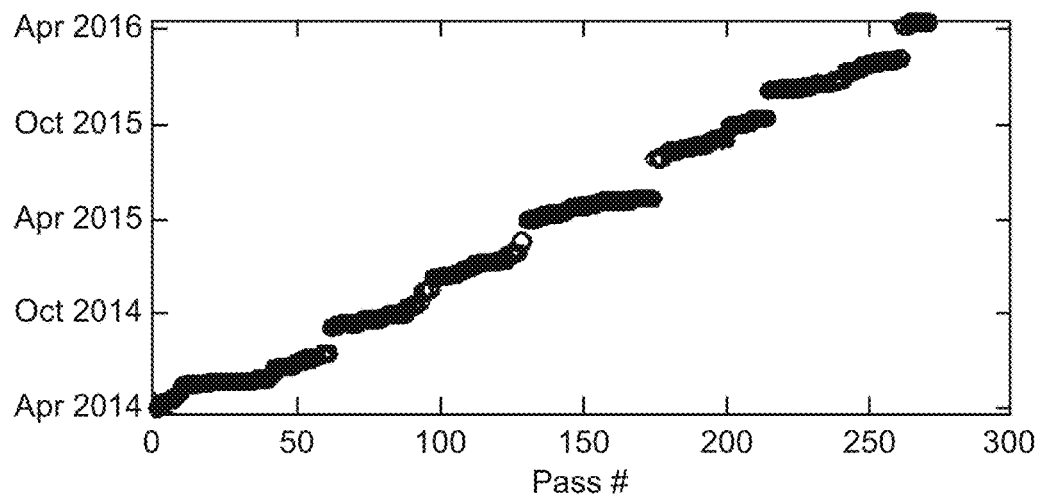
FIGS. 37A-B show the dates of the passes shown in FIG. 36.

FIGS. 36A and 36B show 271 passes from the first train, which has been instrumented for more than two years. The dates of the passes are shown in FIG. 37A. A number of passes have very low values, which can occur for a variety of reasons, such as a malfunction in the acquisition hardware or because a very large vibration event occurred, and due to the normalization, all other values were reduced accordingly. The plots from each of the two sensors are nearly identical; this is both good and bad. It is good because it means that sensors placed within the cabin of the train are relatively insensitive to position, so they can be placed in future instrumentations wherever is most convenient. It is bad because the two sensors are so closely correlated, that when fusing the data, relatively little additional information can be gained. Of particular interest is the vertical line around 0.1 km which was due to high vibrations from a faulty track joint; this joint was replaced on Dec. 15, 2015, or after pass #225, and accordingly, the energy at this location of the track is reduced.

Figure 37B:
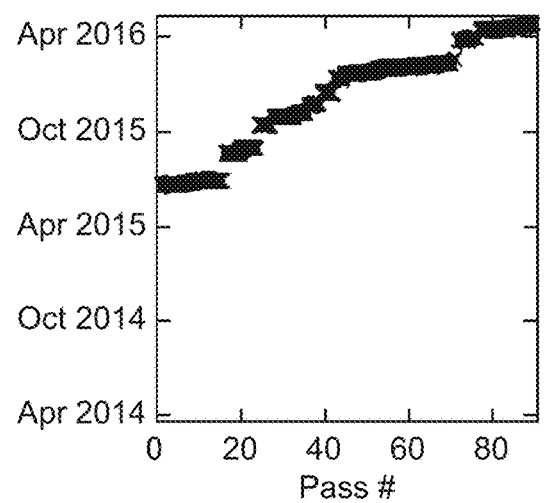

FIGS. 36C and 36D show 89 passes from the second train which was instrumented; the 284 dates of the passes are shown in FIG. 37B. Here too, a change in the data is observed after the track joint (at 0.1 km) was repaired, in this case after pass #47. Notice that there appears to be less GPS error in the data from the second train (i.e. the vertical lines are "straighter"). This likely has to do with the position of the GPS antenna. In the first train, the antenna was placed under the metal roof so had no direct view of the sky; in this instrumentation the GPS was placed in the interurban light enclosure so as to provide a partial view of the sky.

If the data collected is viewed by each pass as an observation of the current state of the tracks, the question is whether data from multiple passes and between the two trains can be combined to build a better estimate of the state of the tracks than is given in any one pass.

Data fusion is discussed at both the train level, i.e. combining data from sensors, and at the network level, i.e. combining data from trains. However in both cases, the most important component of fusion is combining data between passes, because individual passes can have abnormally low values or high position offsets, both of which are handled by the proposed fusion approach.

Figure 38A:
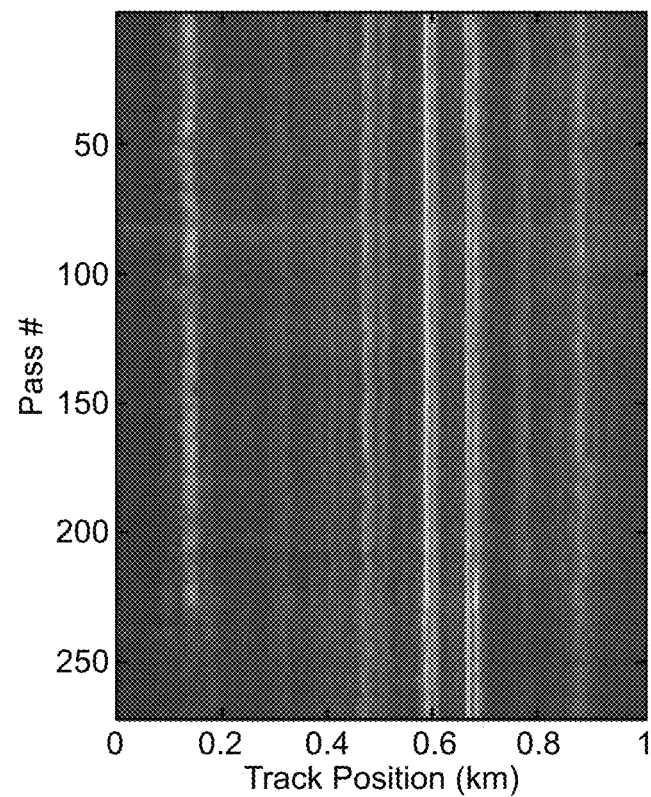
FIGS. 38A-B show the fused estimate of the state of tracks based on data from train 1 and train 2.

The estimate of the state of the tracks found by fusing together the data from train 1 can be seen in FIG. 38A. The estimate at a given pass relies only on the data from that pass and the data from the previous passes. Note that the large features values from the switch gear at 0.6 km end up controlling the alignment process, so the vertical line around 0.6 km is almost perfectly straight. The energy from the faulty track joint at 0.1 km is less straight, because it does not cause enough vibrations to control the alignment and is relatively far away from the track gear, which does. However, the fusion appears to make the change in the tracks at 0.1 km more visible. In addition to the repair of the faulty joint at 0.1 km performed after pass #225, there is another track change which becomes apparent through the data fusion process: a correction to the alignment of the tracks around 0.8 km that was performed after pass #214. This is the result of tamping.

Figure 38B:
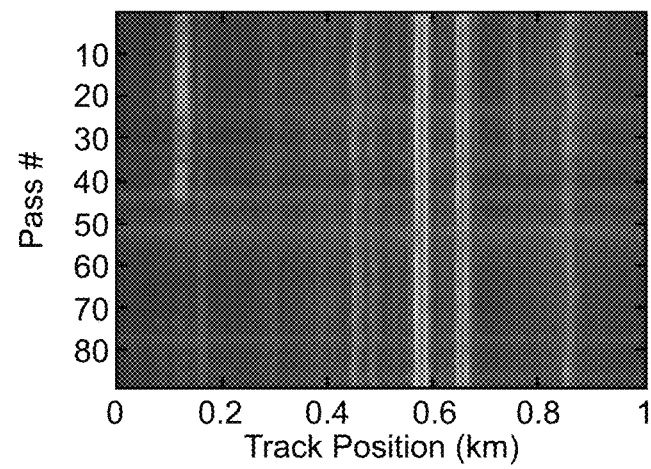

FIG. 38B shows the fused estimate of the state of the tracks using data from train 2. Because more of the passes from train 2 were spurious, the fused estimate of the track state using the data from train 2 appears nosier than the estimate from train 1. Note that the alignment for train 2 differs from the alignment found from train 1. In train 1, the energy from the first switch occurs at 0.6 km, with some high values occurring just after 0.6 km. In the case of the second train, the entirety of the vertical line of high values from the first switch occurs prior to 0.6 km; in essence, the data from the second train is shifted slightly to the left when compared to the data from the first train. This alignment is something which must be considered when fusing the data from both of the trains.

Figure 39:
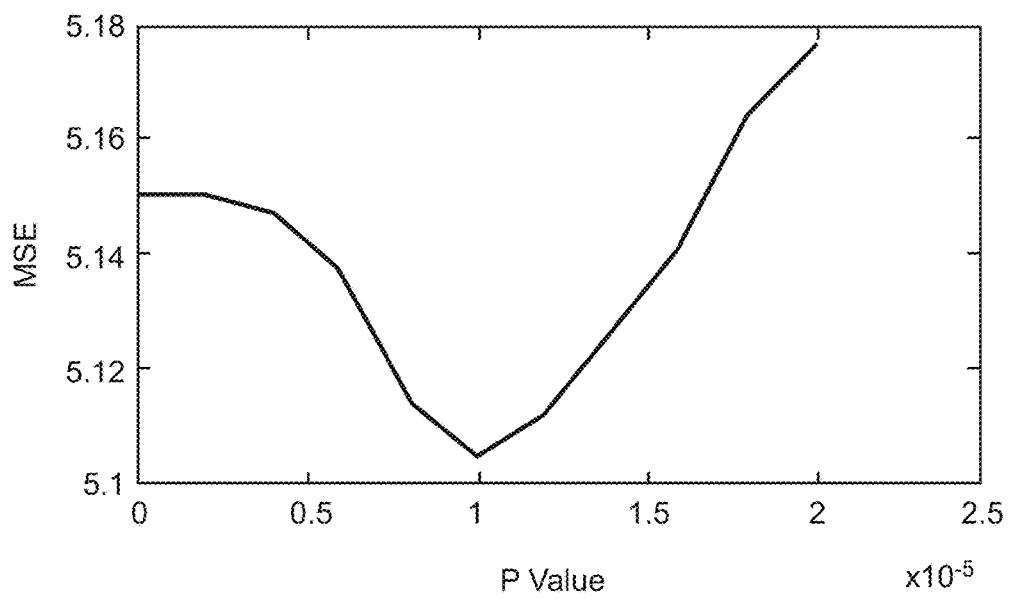
FIG. 39 shows simulation results to determine optimal $p_{min}$ value

One benefit of the proposed data fusion approach is that there is only one parameter to set, $p_{min}$, however a discussion of how that parameter was chosen is necessary. In the simulation, the optimal $p_{min}$ value could be found because the ground truth was known. In this case, the ground truth is not known. One method might be to choose $p_{min}$ empirically such that the fusion approach appears to smooth the data but not smooth it so much such that some track changes are obscured. Doing so indicates that the value around $p_{min}=1\times 10^{-5}$ is reasonable. However a more quantitative approach is possible if a known change in the tracks occurs. In this case, considering the data from train 1, we know that the track was repaired after pass #225. We can assume that the tracks are in one state (state 1) from pass 1-225, and another state (state 2) from pass 226-271. Using this assumption we assume the "ground truth" for state 1 is simply the average of the features for first 225 passes shown in FIGS. 32A and 32B, and the "ground truth" for the second pass, the average of passes 226-271. Just as in the simulation, we can calculate the MSE between the "ground truth" and the output of the fusion approach over all passes. The error for different values of $\square_{minis}$ shown in FIG. 39 which supports the claim that $p_{min}=1\times 10^{-5}$ is optimal. In general, this technique wouldn't work for finding the optimal value of $p_{min}$ for a change of interest (because this change would not be known a priori), however this pseudo-simulation procedure could be used on a prior known change to estimate the optimal $p_{min}$ value for a section track.

Figure 40A:
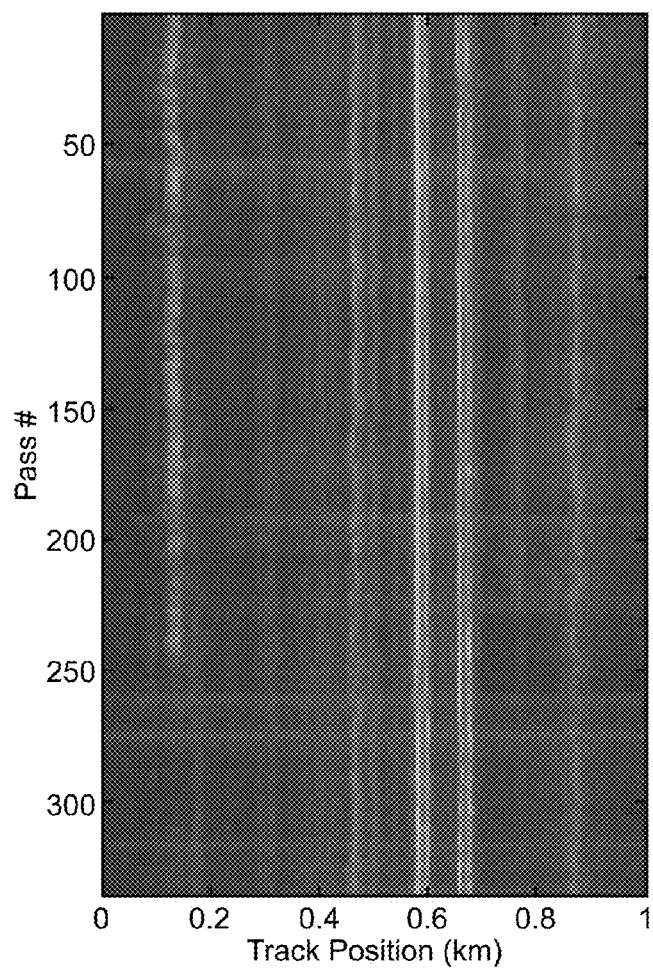
FIGS. 40A-B show the fused estimate for the state of the tracks combining data from both train 1 and train 2 and the dates that the passes occurred from both train 1 and train 2.
Figure 40B:
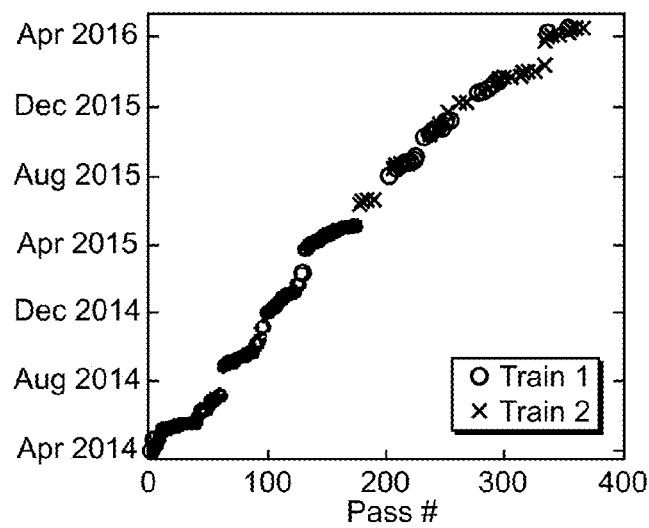

Using this same $p_{min}$ value and the procedures outlined above, we can fuse data from both trains. The first step is to interlace the passes according to the date and time when they were recorded, as seen in FIG. 36B. If this were applied in an on-line setting, it would be equivalent to processing the newest collected data over a section of track as it was acquired. The estimate of the state of tracks from combining both trains is shown in FIG. 40A. In this case, we consider only two sensors on each train, however different number of sensors on each train could easily be handled. Because of the alignment step, the slight difference in GPS positions between the trains is handled, and the combined estimate appears to be as consistent as the data from either of the trains alone.

Evaluation of Data Fusion

To evaluate the fusion of the operational data, it is first necessary to consider the objectives of rail operators when conducting an inspection. As mentioned in the Introduction, operators want inspection techniques that 1) low-cost, 2) reliable and 3) detect faults soon after they occur. The data fusion approach in-terms of the second two objectives, reliability and time of detection, because the "ground truth" feature state of the tracks for the operational data is not known. As data fusion is but one step in an overall data processing pipeline, we must introduce an anomaly or change detection approach (change detection and anomaly detection are used here interchangeably) to assist in evaluating the effect of our proposed Level 1 Fusion on the overall detection performance.

Figure 41A:
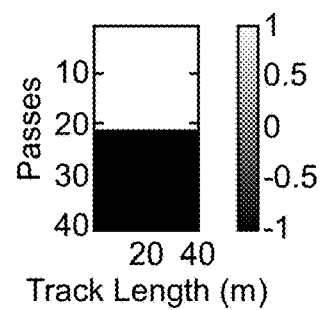
FIGS. 41A-C show an example of change detection with the Haar filter.
Figure 41B:
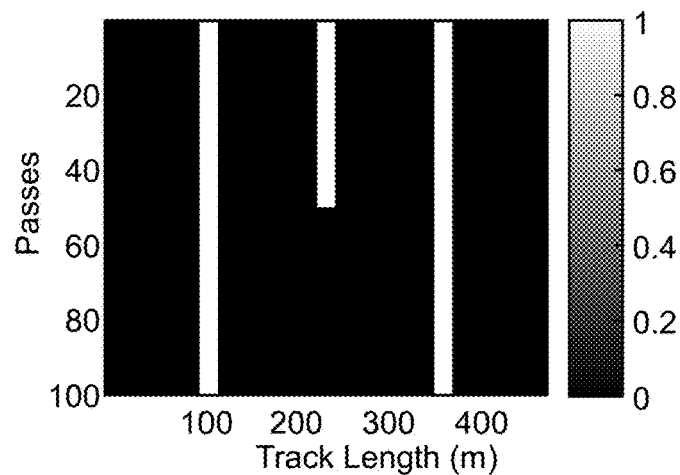
Figure 41C:
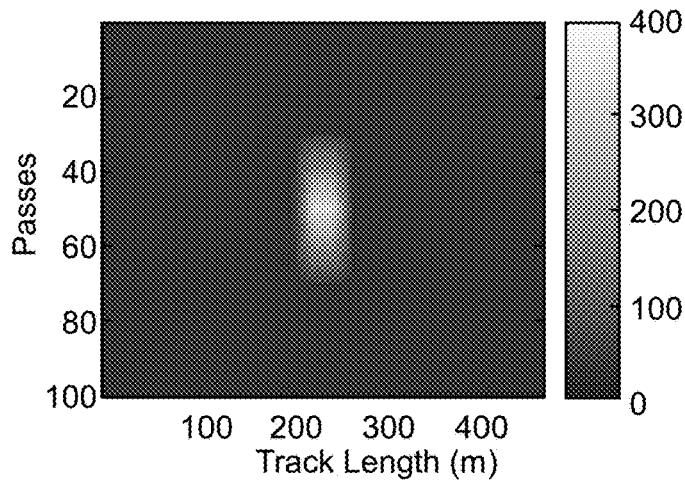

As previously discussed, the Haar filter method was found to be the most effective for train-based monitoring using energy features. Thus the Haar filter is used to assess how accurately and how rapidly changes can be detected both from the data features directly and from the fused features. FIG. 41 shows an example of how change detection with a Haar filter works. A Haar template is shown in FIG. 41A; this template is then convolved with the input data shown in FIG. 41B. The result, shown in FIG. 41C, highlights locations in the input data where a vertical change occurs. In the case of our data, we are only interested in vertical changes; such changes are indicative that the state of the tracks has changed from one pass to another. Note in this example, the Haar template has two blocks, one where values are equal to 1 and another where the values are −1. The vertical length of each block controls how many passes must be collected before a change is detected. Here the block length is 20, so 20 passes would have to be collected after a change before the peak change detection value will occur.

Figure 42A:
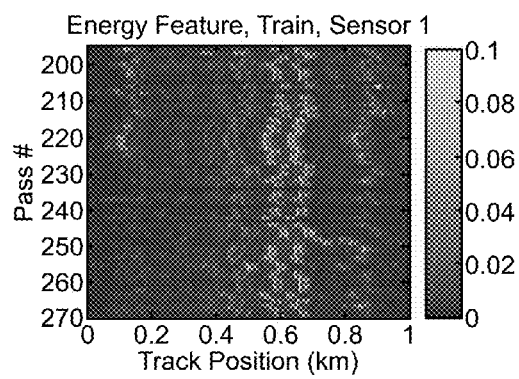
FIGS. 42A-D show change detection results for different levels of data fusion.
Figure 42B:
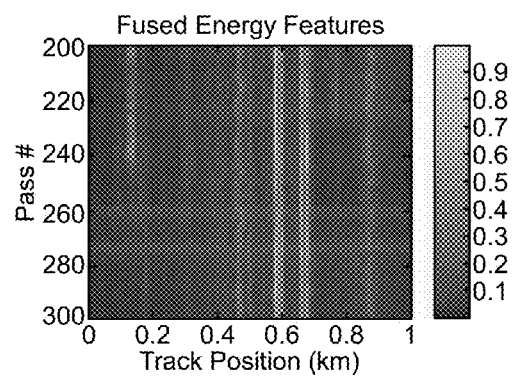
Figure 42C:
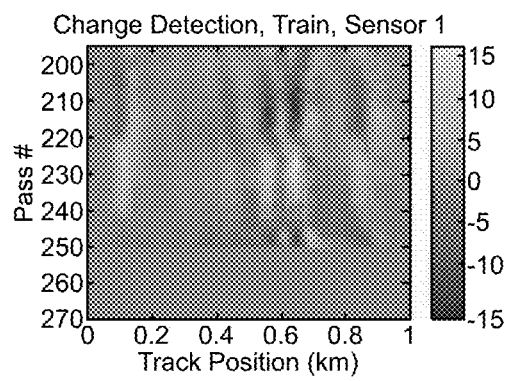
Figure 42D:
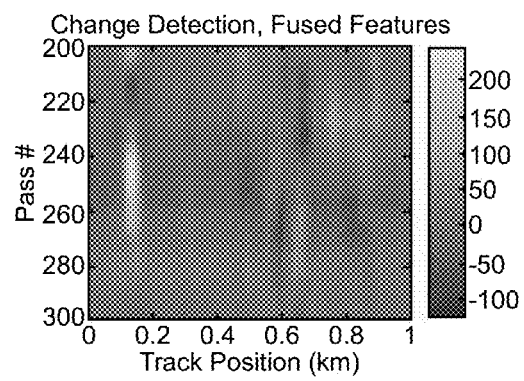

Using the same parameters (block length of 20 passes and width of 40 meters) we can apply the Haar filter to some operational data. The ultimate goal is to determine if the proposed fusion algorithm makes change detection easier. Thus we apply the Haar filter on the features prior to fusion and after fusion. The results are shown in FIG. 42. In both examples, the change in the tracks at 0.1 km is detected to some extent. What differs is how well that change is detected relative to other erroneous changes. In FIG. 42C, the results for the raw features, the erroneous changes detected in the switch gear (around 0.6 km) are larger than the changes detected from the actual track change at 0.1 km. In this case, the "detection ratio," the ratio of the magnitude of the true changes to the magnitude of the erroneous changes, is below 1. A similar change detection analysis on the fused data, as shown in FIG. 42D, produces a detection ratio of 1.9. Notice that in FIG. 38 the data from the last 20 passes is 0. This is because there are only 271 passes to consider so the Haar filter output is undefined beyond pass #251, and we set it equal to zero. In the case where data from both trains are fused together, there is more data, so none of the shown passes have been set to zero.

In addition to the change from the repair of the faulty joint, a second change can be seen in the change detection results from the fused data. As discussed previously, a portion of the track (around 0.75 km) was tamped after pass #227. Although this change is nearly impossible to see in the raw features, the change is evident in the fused data shown in FIG. 16B. Accordingly, the second highest change detection value occurs at 0.75 km and pass #227 in FIG. 42D. Although this tamping change is not the focus of this study, it is worth noting as evidence that the proposed fusion technique could help to detect more subtle track changes.

Figure 43:
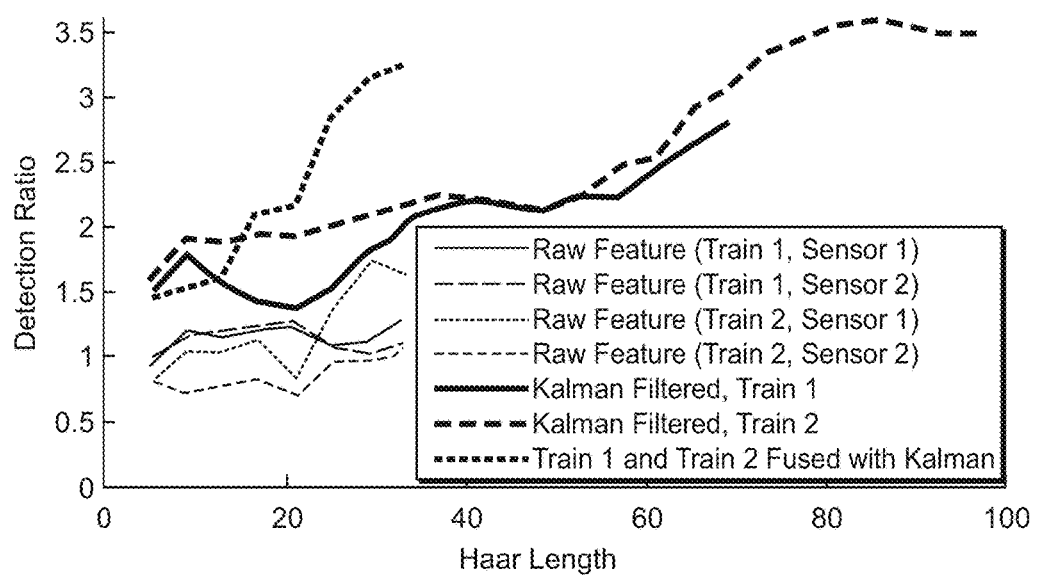
FIG. 43 shows change detection results for a variety of Haar filter lengths.

Thus far we have assumed that the Haar length is always 20 passes; this is an important parameter to explore further as it controls how soon the changes could be detected. We can vary the Haar length while reporting the resultant detection ratio, as shown in FIG. 43. When varying the Haar length in analyzing the features directly (shown in blue), the detection ratio hovers around 1, meaning the change in the tracks is roughly equivalent to erroneous changes. In other words, true changes cannot be detected reliably. We only show Haar lengths of up to 30 passes for the raw data due to the limited number of passes.

| | Before Change | | Change Detected | | Detection Period | |
|---|---|---|---|---|---|---|
| | Last Pass # | Date | Pass # | Date | # of Passes | # of Days |
| Train 1 | 225 | Dec. 8, 2015 | 258 | Jan. 26, 2016 | 33 | 49 |
| Train 2 | 41 | Dec. 8, 2015 | 58 | Feb. 1, 2016 | 17 | 55 |
| Combined | 267 | Dec. 8, 2015 | 292 | Jan. 14, 2016 | 25 | 37 |

Table 1: Detection table, assuming "detection" occurs when the detection ratio exceeds 2. Note that information on the features prior to fusion is not shown as change detection on the raw feature does not achieve a detection ratio above 2.

Fusing data from a single train tends to produce higher detection ratios, shown in green in FIG. 43. The data from train 2 offers particularly high detection ratios, perhaps because the GPS alignment between passes is less noisy. Finally, the detection ratio produced when fusing together all the data, shown in brown, tends to be similar on average to the data of either of the two trains. The benefit of fusing all the data together is evident in how soon a change can be detected (in days) rather than simply in terms of the number of passes.

To illustrate the strength of fusing the data from both trains together, let us consider a hypothetical detection scenario using the historical data we have collected. In this case, the last pass recorded before the track was repaired was on Dec. 8, 2015 (repair work started the following day). Let us assume the minimum acceptable detection ratio is 2 (i.e. a detection event is triggered if one change is twice as high as all other changes). The question is how soon a detection event will be triggered assuming that the data is analyzed after each successive pass, and that in each analysis, a number of different Haar lengths are tried. If only data from train 1 were to be used, a detection ratio of 2 would be achieved on Jan. 26, 2016, using a Haar filter length of 33

(as is shown in Table 1). This would mean detection would require 49 days. If only data from train 2 were to be used, detection would occur on Feb. 1, 2016, with a Haar filter length of 17. Note that fewer passes are required from Train 2, but that the data was collected less often, so the overall detection time is longer. If data from both trains is considered (i.e. all the data is fused together), detection would occur on Jan. 14, 2016, with a Haar filter length of 25. Thus by fusing the data from both trains, the change could be detected sooner than if either train was analyzed on its own.

As shown in the previous section, the data fusion approach can help to facilitate quicker and more reliable detection of changes in the tracks. However one topic requires further discussion is the distribution of noise in the data. The Kalman filter, which is the basis of the proposed data fusion approach, is optimal so long as the noise in the system is zero-mean. If the noise is not zero-mean, the state estimate produced by the Kalman filter is off by the mean of the noise. Although it is impossible to know the precise distribution of the noise in the data we have collected from an operational train, in this section we will attempt to estimate the distribution of one particular noise source and comment on how this distribution affects our proposed approach.

Figure 44A:
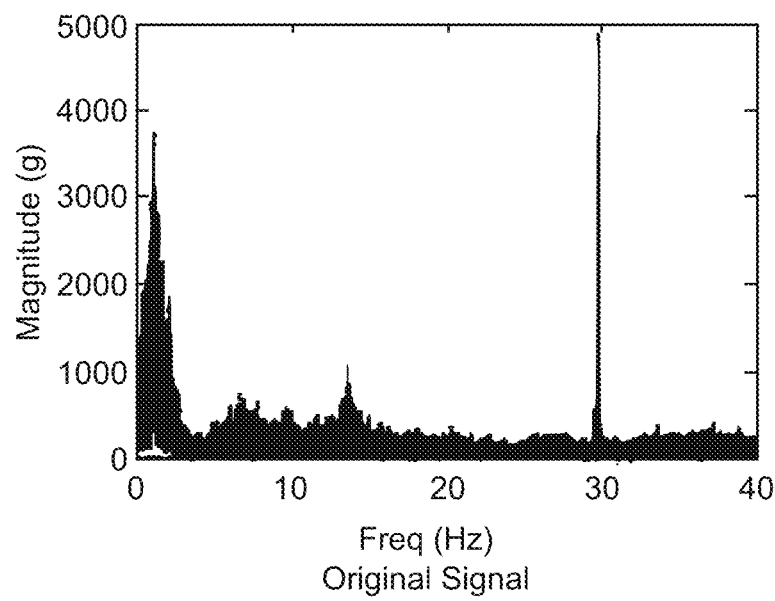
FIGS. 44A-B show the frequency spectrum from one pass over a 4 km track.

FIG. 44A shows a portion of the frequency spectrum of one pass of vibration data collected from train 1. The majority of the energy is around 1.2 Hz which corresponds to the natural frequency of the train's main suspension. Because the train's main suspension is excited by rough sections of track, this part of the signal is useful for determining the state of the tracks.

Figure 45A:
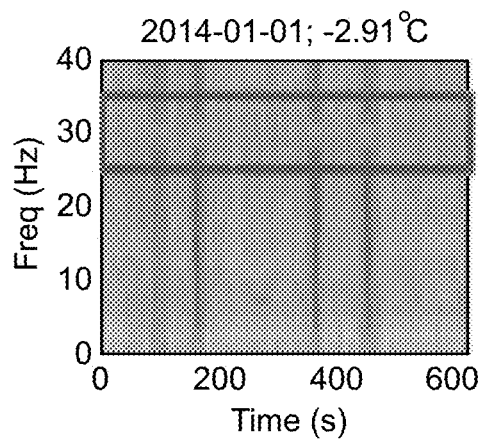
FIGS. 45A-C show spectrograms of signals from three passes over a 4 km section of track.
Figure 45B:
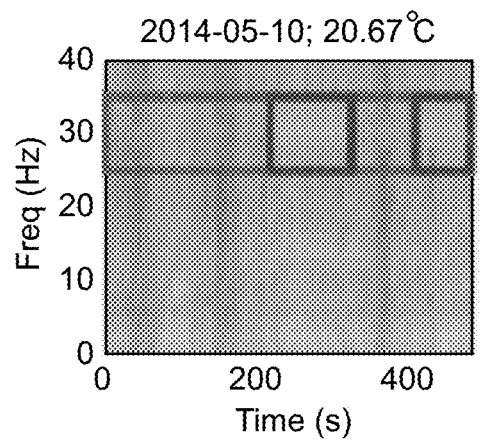
Figure 45C:
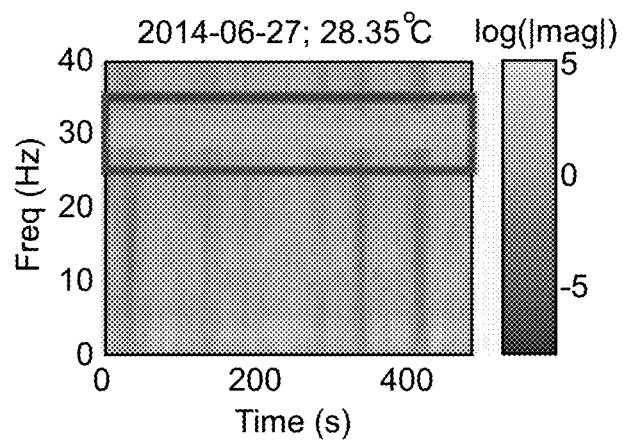

The sharp peak at 30 Hz corresponds to vibrations from the train's ventilation system. This component of the signal is independent of the state of the tracks, so for our purpose, we can label it as noise. Further evidence that this 30 Hz component is from the ventilation system is shown in FIG. 46. Here a spectrogram of the data is shown. The train's speed varies across the pass (which spans 4 km); at certain points the train comes to a stop, which explains why the vibrations are low at some time points across most frequencies. However the signal energy at 30 Hz does not depend on the train speed or interaction with the track; instead it depends on the external temperature. On a cold day, FIG. 45A, the air conditioning is off so there is less energy at 30 Hz. On a warm day, FIG. 45B, the air conditioner operates intermittently, so high energy is seen only occasionally at 30 Hz. Whereas on a hot day, FIG. 45C, the air conditioner operates continuously.

Figure 44B:
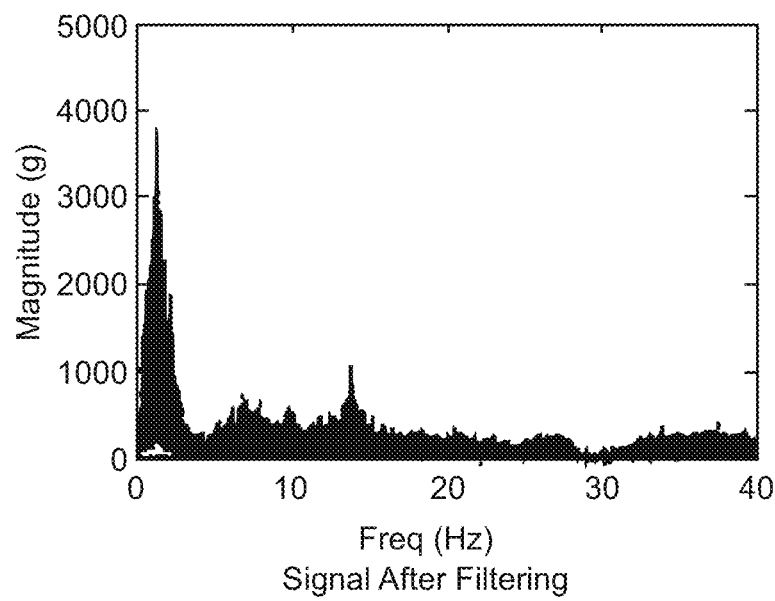
Figure 46A:
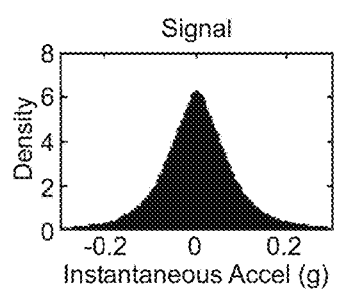
FIGS. 46A-F show the distribution of the signal and the noise
Figure 46B:
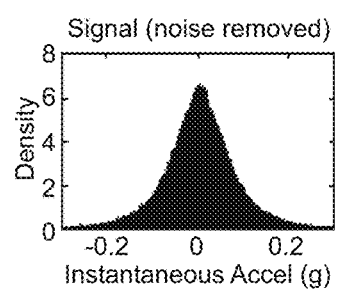
Figure 46C:
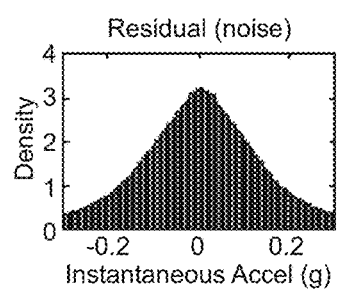

Given the noise at 30 Hz is unrelated to the state of the tracks, we can remove it with a notch filter; the resultant signal is shown in FIG. 44B. We can now analyze the signal with and without this noise in order to determine the effect of the ventilation noise on the energy feature we have used as input for our fusion algorithm. FIG. 46A shows the distribution of the raw signal. As expected, the accelerometer data is zero mean (non-zero mean data would mean the train accelerates upwards or downwards either into space or into the ground), and has an approximately Gaussian shape. Given the ventilation noise is a small component of the overall signal, the signal after notch filtering in FIG. 46B has a distribution similar to FIG. 46A. In FIG. 46C, the distribution of the noise is shown; the noise tends to create larger amplitude vibrations than the rest of the signal, so the distribution is flatter with larger acceleration values at the tail ends.

Figure 46D:
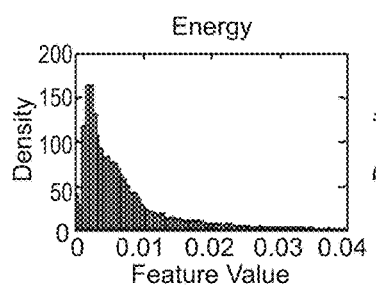
Figure 46E:
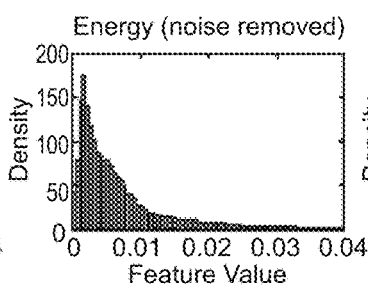
Figure 46F:
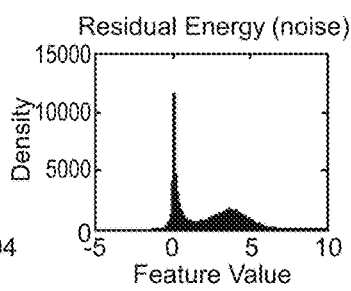

FIGS. 46D-F show the distribution of the signal and the noise after calculating the energy features. This feature involves squaring the data so all values are positive as seen in both FIG. 46D, the features from the entire signal, and FIG. 46E, the signal without ventilation noise. By subtracting the feature without noise in FIG. 46E from the original energy feature in FIG. 46D, we find the effective distribution of the noise, shown in FIG. 46F. The most noteworthy aspect is that the noise has a non-zero mean.

This particular source of noise is not a large component of the signal; however given that this noise has a non-zero mean, we can expect that the other sources of noise might also have non-zero means. Thus, the fact that the proposed data fusion approach was beneficial in detecting track changes may appear at first to be surprising. We would expect all estimates of the feature representation state found through the data fusion approach to be off by the mean value of the noise. However, because we employ a data-driven paradigm, even if the estimates of the state of the tracks are off, so long as they are all off by a similar amount, we can still detect changes in the track. This means that the noise distribution in the feature used as input for the proposed data fusion approach, shouldn't matter, so long as the noise is relatively constant. Thus, this proposed data fusion approach may be useful for fusing a wide variety of feature types.

Although the invention is illustrated and described herein with reference to specific embodiments, the invention is not intended to be limiting to the details shown. Rather, various modifications may be made in the details without departing from the invention.

We claim:

1. A method for detecting changes in rail tracks comprising:
    (a) gathering data generated by one or more sensors mounted on a railcar;
    (b) applying signal processing and machine learning algorithms to said data to extract rail-specific information for one or more discrete sections of said rail track; and
    (c) comparing said rail-specific information for one or more discrete sections of said rail track to historical data for said discrete sections of track to detect anomalies;
    wherein said signal processing and machine learning algorithm uses a sparse constraint when solving an inverse problem to determine the profile of the track.

2. The method of claim 1 wherein said anomalies are deteriorations in said track condition or changes in said track condition due to maintenance activities.

3. The method of claim 2 wherein said anomalies include a change in the roughness of said discrete section of track over a period of time.

4. The method of claim 2 wherein said vibration sensors are oriented to measure vibrations in the vertical direction.

5. The method of claim 4 wherein said vibration sensors record vibrations as said railcar moves over said rail tracks.

6. The method of claim 2 wherein said anomalies include changes in track condition due to tamping activities.

7. The method of claim 1 wherein step (a) further comprises gathering data generated by one or more vibration sensors mounted on a railcar and a positioning system to determine the geographical position of said railcar.

8. The method of claim 7 wherein step (b) further comprises:
    normalizing said data gathered from said vibration and positioning system for environmental and operational conditions; and
    performing a change detection calculation to determine said anomalies in said rail tracks.

9. The method of claim 8 wherein said positioning system is a GPS receiver mounted on said railcar and further wherein said normalizing step includes correcting said data for position due to GPS errors.

10. The method of claim 8 wherein said change detection calculation comprises applying a change detection template modified for a specific type of change of interest.

11. The method of claim 10 wherein said change detection template is applied using a moving window representing a data collected from a pre-determined number of passes of a railcar over each discrete track section.

12. The method of claim 1 further comprising the step of storing said rail-specific information for discrete section of said track in a database.

13. The method of claim 1 wherein said rail-specific information is represented by the signal energy of a vibration signal generated by said one or more sensors.

14. The method of claim 1 further comprising deriving a transfer function for said railcar and a profile of track roughness that best approximates actual data gathered from said one or more sensors, given said sparse constraints.

15. The method of claim 1 wherein data generated from two or more railcars is fused together.

16. The method of claim 15 wherein said fusion of data uses a modified Kalman filter.

* * * * *

UNITED STATES PATENT AND TRADEMARK OFFICE
CERTIFICATE OF CORRECTION

| | | |
|---|---|---|
| PATENT NO. | : 10,351,150 B1 | Page 1 of 1 |
| APPLICATION NO. | : 15/168735 | |
| DATED | : July 16, 2019 | |
| INVENTOR(S) | : Lederman et al. | |

It is certified that error appears in the above-identified patent and that said Letters Patent is hereby corrected as shown below:

In the Specification

In the "GOVERNMENT INTEREST" section:
"This invention was made with government support under National Science Foundation Grant No. CMMI1130616 and CCF1017278, an NSF Graduate Research Fellowship under Grant No. DGE0946825, and a University Transportation Center grant (DTRT12-G-UTC11) from the US Department of Transportation. The U.S. government may have certain rights in this invention."

Should read:
"This invention was made with United States government support under DTRT12-G-UTC11 awarded by the U.S. Department of Transportation, and CCF1017278, CMMI1130616, and DGE0946825 awarded by the National Science Foundation. The U.S. government has certain rights in the invention."

Signed and Sealed this
Twenty-first Day of January, 2025

Coke Morgan Stewart
*Acting Director of the United States Patent and Trademark Office*